(12) United States Patent
Wehrmann et al.

(10) Patent No.: US 11,993,061 B2
(45) Date of Patent: May 28, 2024

(54) MULTILAYER COMPOSITE MATERIAL CONTAINING SPECIAL POLYCARBONATE COMPOSITIONS AS A MATRIX MATERIAL

(71) Applicant: COVESTRO DEUTSCHLAND AG, Leverkusen (DE)

(72) Inventors: Rolf Wehrmann, Krefeld (DE); Anke Boumans, Goch (DE); Helmut Werner Heuer, Siegen (DE); Thomas Grimm, Cologne (DE); Matthias Knaupp, langenfeld (DE); John Bauer, Kitzingen (DE)

(73) Assignee: Covestro Deutschland AG, Leverkusen (DE)

( * ) Notice: Subject to any disclaimer, the term of this patent is extended or adjusted under 35 U.S.C. 154(b) by 85 days.

(21) Appl. No.: 17/538,218

(22) Filed: Nov. 30, 2021

(65) Prior Publication Data

US 2022/0088906 A1  Mar. 24, 2022

Related U.S. Application Data

(62) Division of application No. 16/314,772, filed as application No. PCT/EP2017/066527 on Jul. 3, 2017, now abandoned.

(30) Foreign Application Priority Data

Jul. 4, 2016  (EP) .................... 16177707

(51) Int. Cl.
*B32B 27/12* (2006.01)
*B05D 3/02* (2006.01)
(Continued)

(52) U.S. Cl.
CPC .......... *B32B 27/12* (2013.01); *B05D 3/0218* (2013.01); *B29C 65/02* (2013.01); *B29C 65/44* (2013.01);
(Continued)

(58) Field of Classification Search
CPC .......... B32B 2038/0072; B32B 37/06; B32B 27/365; B32B 27/12; B29C 66/71;
(Continued)

(56) References Cited

U.S. PATENT DOCUMENTS 2,991,273 A  7/1961  Hechelhammer et al.
2,999,835 A  9/1961  Goldberg
(Continued)

FOREIGN PATENT DOCUMENTS

DE  1570703  10/1964
DE  1961668 A1  6/1970
(Continued)

OTHER PUBLICATIONS

Schmidhauser and Sybert, High-Tg Polycarbonate, Handbook of Polycarbonate Science and Technology, 2000, pp. 70-72, Marcel Dekker Inc., New York.
(Continued)

*Primary Examiner* — Vishal I Patel
(74) *Attorney, Agent, or Firm* — The Webb Law Firm

(57) ABSTRACT

Multilayer composite material comprising specific polycarbonate compositions as matrix material The present invention relates to a composite material comprising one or more fibre layers composed of a fibre material and an aromatic polycarbonate-based matrix material. The fibre layer(s) is/are embedded in the matrix material. The present invention further relates to a process for producing these fibre composite materials, to multilayer composite materials comprising several layers of fibre composite material, and to the use of the composite materials for production of components or housing components or housings, and to the components, housing components or housings themselves.

11 Claims, 6 Drawing Sheets

Figure 1:
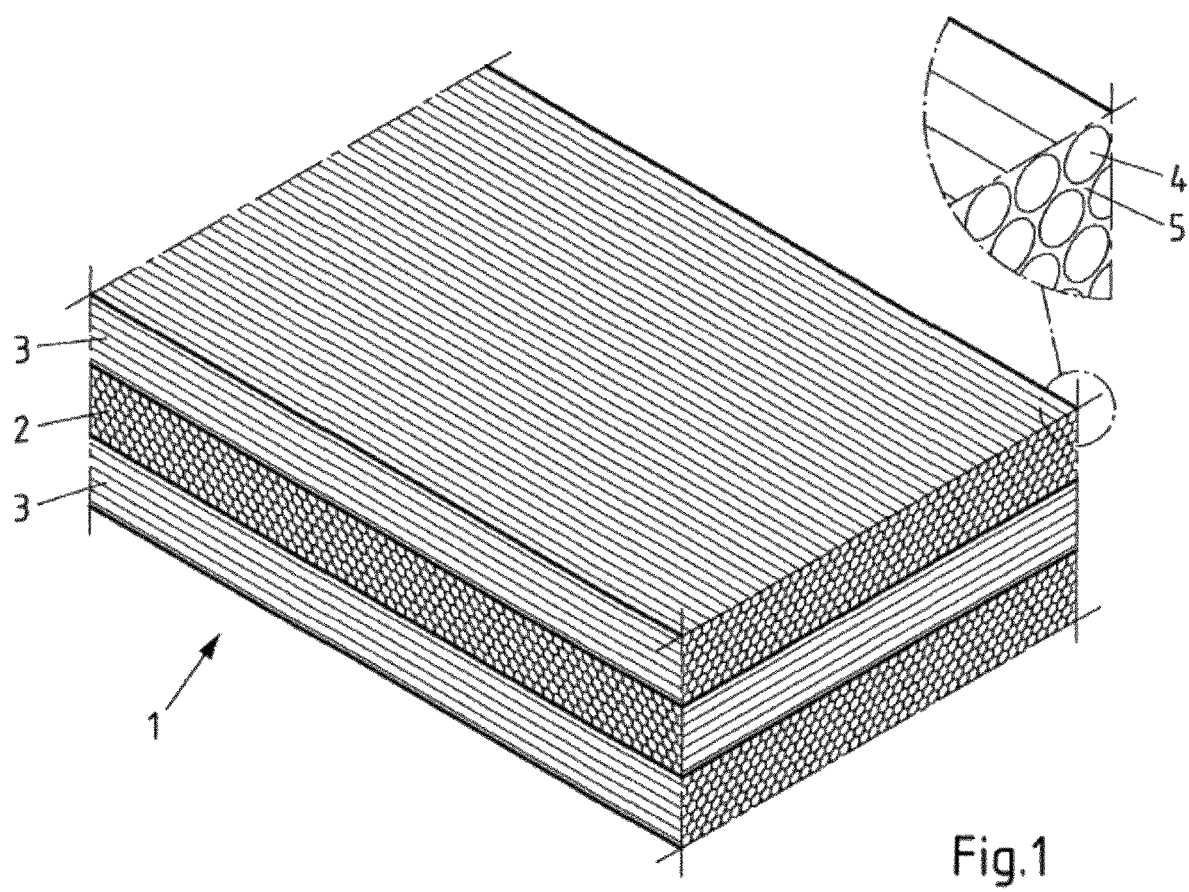

(51) Int. Cl.
| | |
|---|---|
| *B29C 65/02* | (2006.01) |
| *B29C 65/44* | (2006.01) |
| *B32B 5/02* | (2006.01) |
| *B32B 5/26* | (2006.01) |
| *B32B 21/08* | (2006.01) |
| *B32B 21/10* | (2006.01) |
| *B32B 27/08* | (2006.01) |
| *B32B 27/18* | (2006.01) |
| *B32B 27/20* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |
| *B32B 27/42* | (2006.01) |
| *C08J 5/04* | (2006.01) |
| *C08J 5/10* | (2006.01) |
| *C08K 3/34* | (2006.01) |
| *C08K 5/00* | (2006.01) |
| *C08K 5/52* | (2006.01) |
| *C08K 5/521* | (2006.01) |
| *C08K 5/5399* | (2006.01) |
| *C08K 7/04* | (2006.01) |
| *C08L 69/00* | (2006.01) |
| *B29C 65/00* | (2006.01) |
| *B32B 37/06* | (2006.01) |
| *B32B 38/00* | (2006.01) |

(52) U.S. Cl.
CPC .............. *B32B 5/024* (2013.01); *B32B 5/026* (2013.01); *B32B 5/26* (2013.01); *B32B 21/08* (2013.01); *B32B 21/10* (2013.01); *B32B 27/08* (2013.01); *B32B 27/18* (2013.01); *B32B 27/20* (2013.01); *B32B 27/28* (2013.01); *B32B 27/281* (2013.01); *B32B 27/285* (2013.01); *B32B 27/288* (2013.01); *B32B 27/302* (2013.01); *B32B 27/304* (2013.01); *B32B 27/306* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01); *C08J 5/04* (2013.01); *C08J 5/10* (2013.01); *C08K 3/34* (2013.01); *C08K 5/0066* (2013.01); *C08K 5/52* (2013.01); *C08K 5/521* (2013.01); *C08K 5/5399* (2013.01); *C08K 7/04* (2013.01); *C08L 69/00* (2013.01); *B29C 65/022* (2013.01); *B29C 66/71* (2013.01); *B32B 37/06* (2013.01); *B32B 2038/0072* (2013.01); *B32B 2260/023* (2013.01); *B32B 2260/046* (2013.01); *B32B 2262/02* (2013.01); *B32B 2262/0261* (2013.01); *B32B 2262/0269* (2013.01); *B32B 2262/0276* (2013.01); *B32B 2262/10* (2013.01); *B32B 2262/101* (2013.01); *B32B 2262/103* (2013.01); *B32B 2262/106* (2013.01); *B32B 2307/3065* (2013.01); *B32B 2307/4026* (2013.01); *B32B 2307/546* (2013.01); *B32B 2307/558* (2013.01); *B32B 2307/71* (2013.01); *B32B 2307/732* (2013.01); *B32B 2307/738* (2013.01); *B32B 2457/00* (2013.01); *C08J 2369/00* (2013.01)

(58) Field of Classification Search
CPC ....... B29C 65/022; B29C 65/02; C08L 69/00; C08K 7/04; C08K 5/5399; C08K 5/521; C08K 3/34; B05D 3/0218
See application file for complete search history.

(56) References Cited

U.S. PATENT DOCUMENTS

| | | |
|---|---|---|
| 2,999,846 A | 9/1961 | Schnell et al. |
| 3,148,172 A | 9/1964 | Fox |
| 3,271,367 A | 9/1966 | Schnell et al. |
| 3,654,575 A | 4/1972 | Cluwen |
| 3,879,348 A | 4/1975 | Serini et al. |
| 4,982,014 A | 1/1991 | Freitag et al. |
| 5,097,002 A | 3/1992 | Sakashita et al. |
| 5,340,905 A | 8/1994 | Kuhling et al. |
| 5,672,645 A | 9/1997 | Eckel et al. |
| 5,717,057 A | 2/1998 | Sakashita et al. |
| 6,093,759 A | 7/2000 | Gareiss et al. |
| 6,596,840 B1 | 7/2003 | Kratschmer et al. |
| 7,071,284 B2 | 7/2006 | Kauth et al. |
| 7,094,818 B2 | 8/2006 | Lim et al. |
| 9,334,607 B2 | 5/2016 | Borger |
| 2003/0220515 A1 | 11/2003 | Yoshifumi et al. |
| 2004/0249027 A1 | 12/2004 | Lim et al. |
| 2015/0183958 A1* | 7/2015 | Woo .......................... C08K 7/14 524/611 |
| 2016/0257794 A1 | 9/2016 | Grimm et al. |
| 2016/0326366 A1* | 11/2016 | Sybert ..................... C08L 79/08 |
| 2017/0072656 A1* | 3/2017 | Dodworth ............. B32B 37/146 |

FOREIGN PATENT DOCUMENTS

| | | |
|---|---|---|
| DE | 2036052 A1 | 1/1972 |
| DE | 2063050 A1 | 7/1972 |
| DE | 2211956 A1 | 10/1973 |
| DE | 3832396 A | 2/1990 |
| DE | 102011005462 B3 | 6/2012 |
| DE | 102011090143 A1 | 7/2013 |
| EP | 363608 A | 4/1990 |
| EP | 640655 A2 | 3/1995 |
| EP | 0728811 A2 | 8/1996 |
| EP | 2147782 A1 | 1/2010 |
| EP | 2886305 A1 | 6/2015 |
| EP | 3015494 A1 | 5/2016 |
| FR | 1561518 A | 3/1969 |
| GB | 1122003 A | 7/1968 |
| GB | 1229482 A | 4/1971 |
| GB | 1367790 A | 10/1973 |
| JP | 11181268 A | 7/1999 |
| JP | 2006130862 A | 5/2006 |
| JP | 2014513638 A | 6/2014 |
| KR | 101409047 B1 | 6/2014 |
| KR | 1020160067159 A | 6/2016 |
| WO | 9740092 A1 | 10/1997 |
| WO | 200105866 A1 | 1/2001 |
| WO | 2004063249 A1 | 7/2004 |
| WO | 2007065579 A1 | 6/2007 |
| WO | 2012123302 A1 | 9/2012 |
| WO | 2013098224 A1 | 7/2013 |
| WO | 2014208423 A1 | 12/2014 |
| WO | 2015052106 A2 | 4/2015 |
| WO | 2015052114 A1 | 4/2015 |
| WO | WO-2015106204 A1 * | 7/2015 ............ B32B 27/08 |
| WO | WO-2015187873 A1 * | 12/2015 ............ B29B 13/02 |

OTHER PUBLICATIONS

Schnell, Chemistry and Physics of Polycarbonates, 1964, vol. 9, Interscience Publishers, Germany.

* cited by examiner

MULTILAYER COMPOSITE MATERIAL CONTAINING SPECIAL POLYCARBONATE COMPOSITIONS AS A MATRIX MATERIAL

CROSS-REFERENCE TO RELATED APPLICATIONS

This application is a division of U.S. Ser. No. 16/314,772, filed Jan. 2, 2019, which is a national stage application (under 35 U.S.C. § 371) of PCT/EP2017/066527, filed Jul. 3, 2017, which claims benefit of European Application No. 16177707.3, filed Jul. 4, 2016, all of which are incorporated herein by reference in their entirety.

The present invention relates to a fibre composite material comprising one or more fibre layers composed of a fibre material and a polycarbonate-based composition as matrix material, and to a multilayer composite material composed of at least two layers of fibre composite material. The fibre layer(s) is/are embedded in the matrix material. The present invention further relates to a process for producing these fibre composite materials or multilayer composite materials, and to the housings or housing components composed of these (multilayer) composite materials.

Fibre-containing multilayer composite materials having a matrix based on a thermoplastic polymer are referred to both hereinafter and in the prior art as "organosheets".

Organosheets of this kind have higher strength and stiffness compared to extruded plastics sheets without fibre reinforcement and even extend as far as, or can actually surpass, the strength and stiffness of metallic sheets. The significance of materials of this kind, for example as housing components in the electronics and IT industry, but also in the automotive and aircraft industry, is increasing constantly. These composite materials have high stiffness coupled with simultaneously excellent mechanical properties. Compared to conventional materials such as steel, they additionally have a distinct weight advantage. Owing to the fields of use, it is a requirement that the materials used have high flame retardancy.

Further fields of use of such multilayer composite materials are in sectors where lightweight and load-bearing structures are required. As well as the already mentioned automotive sector—for example for tailgates, roof modules, door modules, crossmembers, front-end and rear-end configurations, dashboards etc.—and for aircraft construction, these sectors are utility vehicle construction, the rail vehicles sector, and also items for everyday use, for example domestic appliances.

A further advantage of such polymer-supported multilayer composite materials is the risk of corrosion, which is reduced or entirely ruled out through the absence of steel.

It is known that multilayer composite materials composed of fibre layers such as glass fibre layers or carbon fibre layers can be manufactured in combination with thermoplastic materials. Suitable thermoplastic substrate materials are in principle a multitude of thermoplastics, such as polyethylene or polypropylene, polyamides, for example nylon-6, nylon-6,6, nylon-6,12, polycarbonates, especially aromatic polycarbonates based on bisphenol A, thermoplastic polyurethanes, polyoxymethylene, polyphenylene ethers, styrene polymers, for example polystyrene, and styrene-containing copolymers such as acrylonitrile-butadiene-styrene copolymers and styrene-acrylonitrile copolymers, polytetrafluoroethylene, polyaromatics, for example polyphenylene sulphide, polyether sulphone, polysulphone, polyether ether ketone, polyether imide, polyacrylate or polyamide imide, polyquinoxalines, polyquinolines or polybenzimidazoles, polyesters such as polyethylene terephthalate or polybutylene terephthalate, polyacrylonitrile or polyvinyl compounds such as polyvinyl chloride, polyvinylidene chloride, polyvinyl esters, for example polyvinyl acetate, polyvinyl alcohols, polyvinyl acetals, polyvinyl ethers, polyvinyllactams, polyvinylamines and mixtures of the polymers mentioned.

The production of endless fibre-containing composite materials is described, for example, in EP 2 886 305 A1. The use of polycarbonate as matrix material is also mentioned here.

An advantageous process for producing fibre composite materials is described in WO 2012/123302 A1. In this process, the melt application is followed by pressure-shear vibration until the raw fibre composite material layer has a temperature above the glass transition temperature of the polymer, which achieves effective incorporation of the polymer melt into the entire fibre volume structure of the raw fibre composite material layer. The pressure-shear vibration efficiently drives out gas volumes still present within the raw fibre composite material layer.

It has been found that polycarbonate-based compositions that the person skilled in the art would consider suitable as matrix materials for production of fibre composite materials cannot be processed simultaneously by this advantageous process to give fibre composite materials and do not lead to multilayer composite materials having good flame retardancy properties. Polycarbonate compositions of this kind do not have adequate impregnation properties to achieve an intimate bond between the fibres of the fibre tapes and the polycarbonate phase. This effect is also referred to as inadequate fibre coupling to the matrix and leads to adverse properties, for example elevated brittleness and poorer mechanical properties. Furthermore, elevated dust formation is observed at the surfaces of the fibre composite materials, since the (mechanical) wear on the fibres is higher than in the case of good fibre-matrix coupling. The effects mentioned can also lead to poorer flame retardancy properties.

The problem addressed was therefore that of providing a fibre composite material that meets the UL 94 V-0 requirement at 0.8 mm, preferably to 3 mm, and hence is suitable as housing material, possibly as multilayer composite material, for a housing of an electronic device. For this purpose, the material should additionally be lightweight and be producible inexpensively, for example via the process specified.

It has been found that, surprisingly, this problem is solved by a fibre composite material comprising at least one layer of fibre material embedded into an aromatic polycarbonate-based composition comprising A) aromatic polycarbonate,
B) 1% by weight to 14% by weight of talc,
C) 7% by weight to 15% by weight of at least one cyclic phosphazene of formula (1)

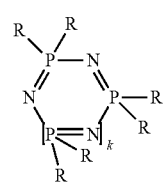

(1)

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, where the trimer content (k=1) is preferably from 50 to 98 mol %, based on component C, D) 0% to 11% by weight of at least one phosphorus compound of the general formula (V)

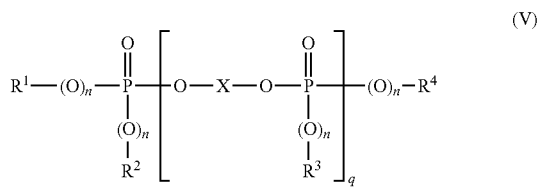

where $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged, E) 0% to 0.2% by weight of at least one stabilizer selected from the group consisting of alkyl phosphate, ethylenediaminetetraacetic acid and/or citric acid, F) optionally further additives, wherein the composition is free of PTFE.

The figures given here in "% by weight" are based in each case on the overall aromatic polycarbonate-based composition.

The present invention further provides a multilayer composite material comprising at least two and preferably at least three superposed layers of such a fibre composite material, wherein, in the case of three layers, these are defined relative to one another as two outer layers of fibre composite material and at least one inner layer of fibre composite material. The layers of fibre composite material may consist of the same or of different material of the above-described composition; preferably, the matrix material is the same in all layers.

Matrix Material

Component A

Polycarbonates in the context of the present invention are either homopolycarbonates or copolycarbonates and/or polyester carbonates; the polycarbonates may be linear or branched in a known manner. According to the invention, it is also possible to use mixtures of polycarbonates.

The thermoplastic polycarbonates including the thermoplastic aromatic polyester carbonates preferably have mean molecular weights $M_w$ of 15000 g/mol to 34000 g/mol, preferably of 17000 g/mol to 33000 g/mol, especially of 19000 g/mol to 32000 g/mol, determined by means of gel permeation chromatography using a BPA polycarbonate calibration and dichloromethane as eluent, with a concentration of 2 g/l, flow rate 1.0 ml/min at a temperature of 30° C. using UV and/or RI detection.

A portion of up to 80 mol %, preferably of 20 mol % to 50 mol %, of the carbonate groups in the polycarbonates used in accordance with the invention may be replaced by aromatic dicarboxylic ester groups. Polycarbonates of this kind that incorporate both acid radicals from the carbonic acid and acid radicals from aromatic dicarboxylic acids into the molecular chain are referred to as aromatic polyester carbonates. In the context of the present invention, they are covered by the umbrella term of thermoplastic aromatic polycarbonates.

The polycarbonates are prepared in a known manner from diphenols, carbonic acid derivatives, optionally chain terminators and optionally branching agents, and the polyester carbonates are prepared by replacing a portion of the carbonic acid derivatives with aromatic dicarboxylic acids or derivatives of the dicarboxylic acids, to a degree according to the extent to which carbonate structural units in the aromatic polycarbonates are to be replaced by aromatic dicarboxylic ester structural units.

Dihydroxyaryl compounds suitable for the preparation of polycarbonates are those of the formula (2)

in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

Preferably, Z in formula (2) is a radical of the formula (3)

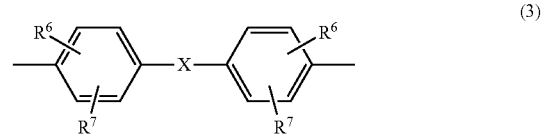

where $R^6$ and $R^7$ are independently H, $C_1$- to $C_{18}$-alkyl-, $C_1$- to $C_{18}$-alkoxy, halogen such as Cl or Br or in each case optionally substituted aryl or aralkyl, preferably H or $C_1$- to $C_{12}$-alkyl, more preferably H or $C_1$- to $C_8$-alkyl and most preferably H or methyl, and X is a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, and also $C_6$- to $C_{12}$-arylene which may optionally be fused to aromatic rings containing further heteroatoms.

Preferably, X is a single bond, $C_1$- to $C_5$-alkylene, $C_2$- to $C_5$-alkylidene, $C_5$- to $C_6$-cycloalkylidene, —O—, —SO—, —CO—, —S—, —$SO_2$— or a radical of the formula (3a)

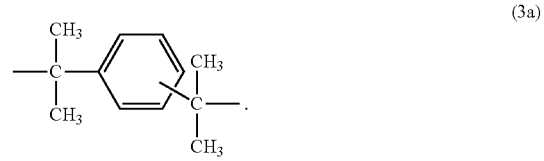

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulphides, bis(hydroxyphenyl) sulphones, bis(hydroxyphenyl) sulphoxides, 1,1'-bis(hydroxyphenyl)diisopropylbenzenes and the ring-alkylated and ring-halogenated compounds thereof.

Examples of diphenols suitable for the preparation of the polycarbonates and copolycarbonates to be used in accordance with the invention include hydroquinone, resorcinol, dihydroxydiphenyl, bis(hydroxyphenyl)alkanes, bis(hydroxyphenyl)cycloalkanes, bis(hydroxyphenyl) sulphides, bis(hydroxyphenyl) ethers, bis(hydroxyphenyl) ketones, bis(hydroxyphenyl) sulphones, bis(hydroxyphenyl) sulphoxides, α,α'-bis(hydroxyphenyl)diisopropylbenzenes, and the alkylated, ring-alkylated and ring-halogenated compounds thereof. Preparation of copolycarbonates can also be accomplished using Si-containing telechelics, such that what are called Si copolycarbonates are obtained.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulphone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC), and also the bisphenols (I) to (III)

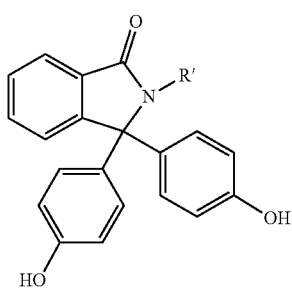

(I)

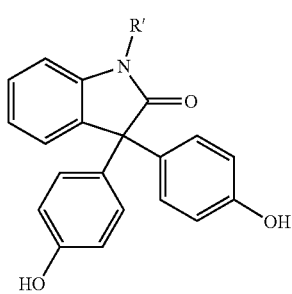

(II)

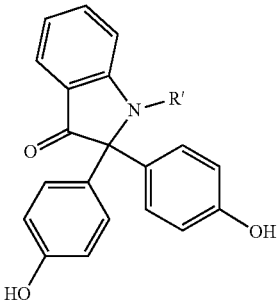

(III)

in which R' in each case is a $C_1$- to $C_4$-alkyl radical, aralkyl radical or aryl radical, preferably a methyl radical or phenyl radical, most preferably a methyl radical.

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the diphenols of the formulae (I), (II) and/or (III).

These and further suitable diphenols are described, for example, in U.S. Pat. No. 2,999,835 A, Pat. No. 3,148,172 A, Pat. No. 2,991,273 A, Pat. No. 3,271,367 A, Pat. No. 4,982,014 A and Pat. No. 2,999,846 A, in German published specifications 1 570 703 A, 2 063 050 A, 2 036 052 A, 2 211 956 A and 3 832 396 A, in French patent specification 1 561 518 A1, in the monograph "H. Schnell, Chemistry and Physics of Polycarbonates, Interscience Publishers, New York 1964, p. 28 ff.; p.102 ff.", and in "D. G. Legrand, J. T. Bendier, Handbook of Polycarbonate Science and Technology, Marcel Dekker New York 2000, p. 72ff.".

Only one diphenol is used in the case of the homopolycarbonates; two or more diphenols are used in the case of copolycarbonates.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane or the two monomers bisphenol A and 4,4'-dihydroxydiphenyl, and homo- or copolycarbonates derived from the diphenols of the formulae (I), (II) and/or (III)

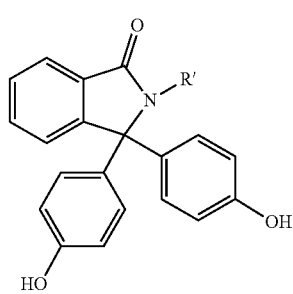

(I)

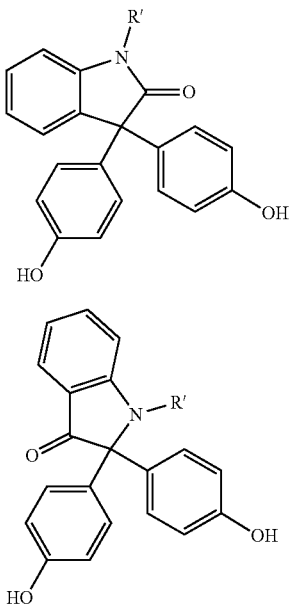

in which R' in each case is $C_1$- to $C_4$-alkyl, aralkyl or aryl, preferably methyl or phenyl, most preferably methyl, especially with bisphenol A.

The diphenols used, like all the other chemicals and auxiliaries added to the synthesis, may be contaminated with the impurities originating from their own synthesis, handling and storage. However, it is desirable to work with the purest possible raw materials.

Preference is also given to copolycarbonates having one or more monomer units of a siloxane of the general formula (1e)

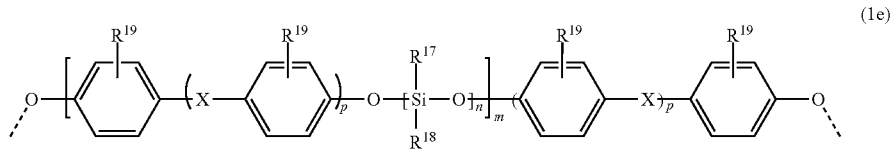

where
$R^{19}$ is hydrogen, Cl, Br or a $C_1$- to $C_4$-alkyl radical, preferably hydrogen or a methyl radical, more preferably hydrogen, $R^{17}$ and $R^{18}$ are the same or different and are each independently an aryl radical, a $C_1$- to $C_{10}$-alkyl radical or a $C_1$- to $C_{10}$-alkylaryl radical, preferably each a methyl radical, and where X is a single bond, —CO—, —O—, a $C_1$- to $C_6$-alkylene radical, a $C_2$- to $C_5$-alkylidene radical, a $C_5$- to $C_{12}$-cycloalkylidene radical or a $C_6$- to $C_{12}$-arylene radical which may optionally be fused to further aromatic rings containing heteroatoms, where X is preferably a single bond, a $C_1$- to $C_5$-alkylene radical, a $C_2$- to $C_5$-alkylidene radical, a $C_5$- to $C_{12}$-cycloalkylidene radical, —O— or —CO—, further preferably a single bond, an isopropylidene radical, a $C_5$- to $C_{12}$-cycloalkylidene radical or —O—, most preferably an isopropylidene radical, n is a number from 1 to 500, preferably from 10 to 400, more preferably from 10 to 100, most preferably from 20 to 60, m is a number from 1 to 10, preferably from 1 to 6, more preferably from 2 to 5, p is 0 or 1, preferably 1, and the value of n×m is preferably between 12 and 400, further preferably between 15 and 200, where the siloxane is preferably reacted with a polycarbonate in the presence of an organic or inorganic salt of a weak acid having a $pK_A$ of 3 to 7 (25° C.).

Copolycarbonates having monomer units of the formula (1e) and especially also the preparation thereof are described in WO 2015/052106 A2.

The total proportion of the monomer units based on the formulae (I), (II), (III), 4,4'-dihydroxydiphenyl and/or bisphenol TMC in the copolycarbonate is preferably 0.1-88 mol %, more preferably 1-86 mol %, even more preferably 5-84 mol % and especially 10-82 mol % (based on the sum total of the moles of diphenols used).

The copolycarbonates may be in the form of block and random copolycarbonate. Particular preference is given to random copolycarbonates.

The ratio of the frequency of the diphenoxide monomer units in the copolycarbonate is calculated here from the molar ratio of the diphenols used.

The relative solution viscosity of the copolycarbonates, determined to ISO 1628-4:1999, is preferably in the range of 1.15-1.35.

The weight-average molar masses $M_w$ of the copolycarbonates are preferably 15000 to 40000 g/mol, more preferably 17000 to 36000 g/mol, most preferably 17000 to 34000 g/mol, and are determined by means of GPC in methylene chloride against polycarbonate calibration.

The monofunctional chain terminators required to control the molecular weight, such as phenols or alkylphenols, especially phenol, p-tert-butylphenol, isooctylphenol, cumylphenol, the chlorocarbonic esters thereof or acid chlorides of monocarboxylic acids or mixtures of these chain terminators, are either supplied to the reaction with the bisphenoxide(s) or else added to the synthesis at any desired juncture, provided that phosgene or chlorocarbonic acid end groups are still present in the reaction mixture, or in the case of the acid chlorides and chlorocarbonic esters as chain terminators, provided that sufficient phenolic end groups of the forming polymer are available. Preferably, the chain terminator(s), however, is/are added after the phosgenation at a location or at a juncture where no phosgene is present any longer, but the catalyst has not yet been metered in, or they are metered in upstream of the catalyst, together with the catalyst or in parallel.

Any branching agents or branching agent mixtures to be used are added to the synthesis in the same way, but typically before the chain terminators. Typically, trisphenols, quaterphenols or acid chlorides of tri- or tetracarboxylic acids are used, or else mixtures of the polyphenols or the acid chlorides.

Some of the compounds having three or more than three phenolic hydroxyl groups that are usable as branching agents are, for example, phloroglucinol, 4,6-dimethyl-2,4, 6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of any branching agents to be used is 0.05 mol % to 2 mol %, again based on moles of diphenols used in each case.

The branching agents may either be included together with the diphenols and the chain terminators in the initially charged aqueous alkaline phase or be added dissolved in an organic solvent before the phosgenation.

All these measures for preparation of the polycarbonates are familiar to those skilled in the art.

Aromatic dicarboxylic acids suitable for the preparation of the polyester carbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulphone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of the dicarboxylic acids are the dicarbonyl halides and the dialkyl dicarboxylates, especially the dicarbonyl chlorides and the dimethyl dicarboxylates.

The carbonate groups are replaced essentially stoichiometrically and also quantitatively by the aromatic dicarboxylic ester groups, and so the molar ratio of the coreactants is also reflected in the finished polyester carbonate. The aromatic dicarboxylic ester groups can be incorporated either randomly or in blocks.

Preferred modes of preparation of the polycarbonates for use in accordance with the invention, including the polyestercarbonates, are the known interfacial process and the known melt transesterification process (cf. e.g. WO 2004/063249 A1, WO 2001/05866 A1, U.S. Pat. No. 5,340,905 A, Pat. No. 5,097,002 A, US-A Pat. No. 5,717,057 A).

In the former case, the acid derivatives used are preferably phosgene and optionally dicarbonyl chlorides, and in the latter case preferably diphenyl carbonate and optionally dicarboxylic esters. Catalysts, solvents, workup, reaction conditions etc. for polycarbonate preparation or polyester carbonate preparation are sufficiently well-described and known in both cases.

"Polycarbonate compositions" or else "polycarbonate-based compositions" are those compositions wherein the base material, i.e. the predominant component present, is a polycarbonate. "Predominant" here means more than 50% by weight, preferably more than 70% by weight, even more preferably more than 80% by weight, even more preferably still more than 90% by weight, of polycarbonate.

Component B

As component B it is possible to use naturally occurring or synthetically produced talc.

Pure, synthetically produced talc, in the ideal composition, has the chemical composition 3 MgO4SiOH$_2$O and hence an MgO content of 31.9% by weight, an SiO$_2$ content of 63.4% by weight and a content of chemically bound water of 4.8% by weight. This is a silicate having a sheet structure. Naturally occurring talc materials generally do not have the above-recited ideal composition since they are contaminated through partial exchange of the magnesium for other elements, through partial exchange of silicon for aluminium, for example, and/or through intergrowth with other minerals, for example dolomite, magnesite and chlorite.

As component B it is preferably possible to use those talc types having particularly high purity. These are characterized by an MgO content of 28% to 35% by weight, preferably 30% to 33% by weight, more preferably 30.5% to 32% by weight, and an SiO$_2$ content of 55% to 65% by weight, preferably 58% to 64% by weight, more preferably 60% to 62.5% by weight. Particularly preferred talc types additionally feature an Al$_2$O$_3$ content of less than 5% by weight, more preferably less than 1% by weight, especially less than 0.7% by weight.

Preference is given especially to the use of talc in the form of finely ground types having a mean particle diameter $d_{50}$ of 0.1 to 20 µm, preferably 0.2 to 10 µm, more preferably 0.5 to 5 µm, even more preferably 0.7 to 2.5 µm and especially preferably 1.0 to 2.0 µm.

The talc-based mineral fillers for use in accordance with the invention preferably have an upper particle size or grain size $d_{97}$ of less than 50 µm, preferably less than 10 µm, more preferably less than 6 µm and especially preferably less than 2.5 µm. The $d_{97}$ and $d_{50}$ values of the fillers are determined by SEDIGRAPH D 5000 sedimentation analysis according to ISO 13317-3:2001.

As a result of the processing to give the moulding compounds or to give mouldings, the particulate fillers may have a smaller $d_{97}$ or $d_{50}$ in the moulding composition or in the moulding than in the talc originally used. The preferred ranges specified are based on the talc in its form as originally used in the compositions.

The talc may have been surface-treated in order to assure better coupling to the polymer matrix. The talc may, for example, have been modified with an adhesion promoter system based on functionalized silanes. With regard to the processing and production of the compositions, the use of compacted talc is advantageous.

According to the invention, 1% by weight to 14% by weight, preferably 2% to 12% by weight and more preferably 3% to 12% by weight of talc is used, based on the overall composition.

Component C

Phosphazenes according to component C which are used according to the present invention are cyclic phosphazenes of formula (1)

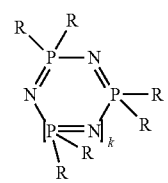

(1)

where
R in each case is the same or different and is
an amine radical, an in each case optionally halogenated, preferably fluorinated, more preferably monohalogenated, $C_1$- to $C_8$-alkyl radical, preferably methyl radical, ethyl radical, propyl radical or butyl radical, a $C_1$- to $C_8$-alkoxy radical, preferably a methoxy radical, ethoxy radical, propoxy radical or butoxy radical, an in each case optionally alkyl-substituted, preferably $C_1$- to $C_4$-alkyl-substituted, and/or halogen-substituted, preferably chlorine- and/or bromine-substituted, $C_5$- to $C_6$-cycloalkyl radical, an in each case optionally alkyl-substituted, preferably $C_1$- to $C_4$-alkyl-substituted, and/or halogen-substituted, preferably chlorine-, bromine- and/or hydroxy-substituted, $C_6$- to $C_{20}$-aryloxy radical, preferably phenoxy radical, naphthyloxy radical, an in each case optionally alkyl-substituted, preferably $C_1$- to $C_4$-alkyl-substituted, and/or halogen-substituted, preferably chlorine- and/or bromine-substituted, $C_7$- to $C_{12}$-aralkyl radical, preferably phenyl-$C_1$- to -$C_4$-alkyl radical, or a halogen radical, preferably chlorine or fluorine, or an OH radical, k is an integer from 1 to 10, preferably a number from 1 to 8, more preferably 1 to 5, most preferably 1.

Preference is given in accordance with the invention to using commercially available phosphazenes; these are typically mixtures of cycles of different ring size. Preference is given to: propoxyphosphazene, phenoxyphosphazene, methylphenoxyphosphazene, aminophosphazene and fluoroalkylphosphazenes, and phosphazenes of the following structures:

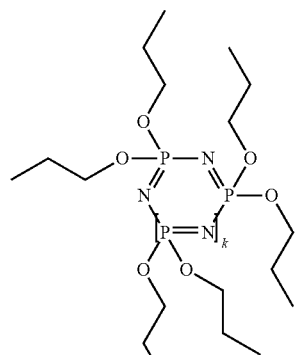

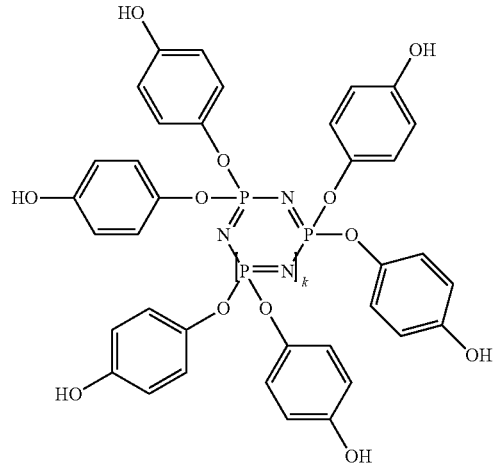

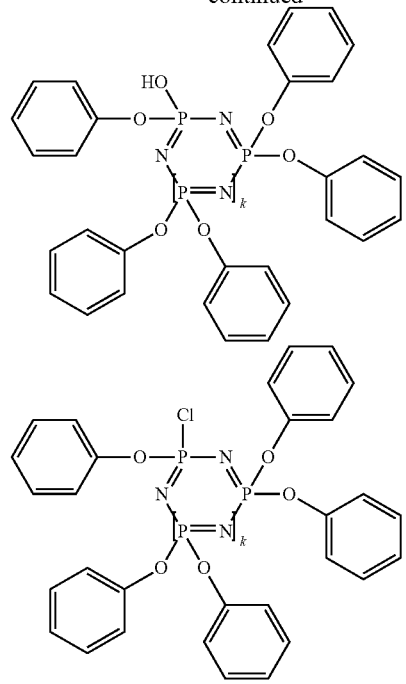

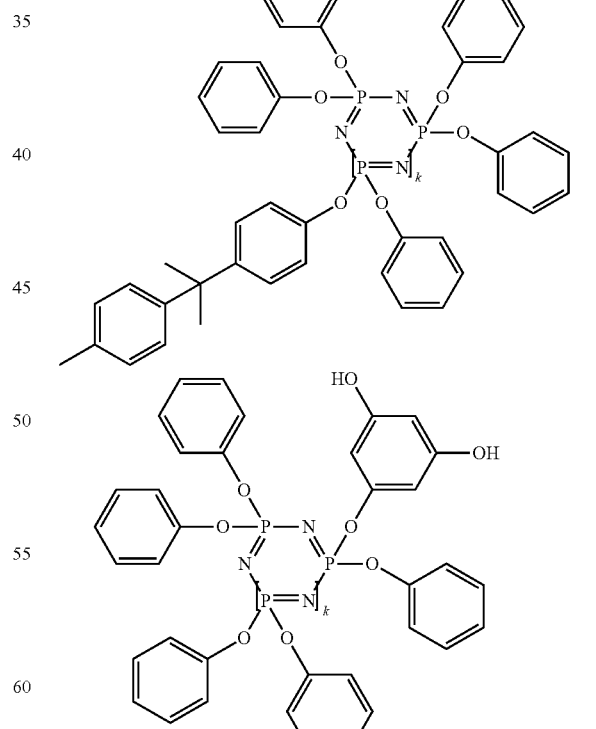

In the compounds shown above, k=1, 2 or 3.

Preferably, the proportion of phosphazenes that are halogen-substituted on the phosphorus, for example composed of incompletely reacted starting material, is less than 1000 ppm, further preferably less than 500 ppm.

The phosphazenes can be used alone or in a mixture. The R radical may always be the same or two or more radicals in the formulae may be different. Preferably, the R radicals in a phosphazene are identical.

In a further preferred embodiment, only phosphazenes with the same R are used.

In a preferred embodiment, the proportion of the tetramers (k=2) is from 2 to 50 mol %, based on component C, further preferably from 5 to 40 mol %, even more preferably from 10 to 30 mol %, especially preferably from 10 to 20 mol %.

In a preferred embodiment, the proportion of the higher oligomeric phosphazenes (k=3, 4, 5, 6 and 7) is from 0 to 30 mol %, based on component C, further preferably from 2.5 to 25 mol %, even more preferably from 5 to 20 mol % and especially preferably 6-15 mol %.

In a preferred embodiment, the proportion of the oligomers with k≥8 is from 0 to 2.0 mol %, based on component C, and preferably from 0.10 to 1.00 mol %.

In a further-preferred embodiment, the phosphazenes of component C fulfil all three aforementioned conditions with regard to the proportions of oligomers.

Particular preference is given to phenoxyphosphazene (all R=phenoxy, formula XI) having a proportion of oligomers with k=1 (hexaphenoxyphosphazene) of 50 to 98 mol %, more preferably 70 to 72% by weight. If phenoxyphosphazene is used, most preferably, the proportion of oligomers with k=2 is 15% to 20% by weight and that of oligomers with k≥3 is 11% to 13% by weight.

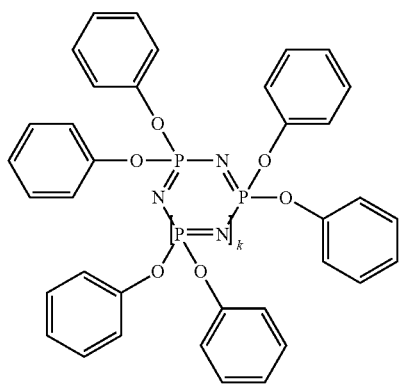

(XI)

Alternatively, more preferably, component C is a phenoxyphosphazene having a trimer content (k=1) of 70 to 85 mol %, a tetramer content (k=2) of 10 to 20 mol %, a proportion of higher oligomeric phosphazenes (k=3, 4, 5, 6 and 7) of 3 to 8 mol % and a phosphazene oligomer with k≥8 of 0.1 to 1 mol %, based on component C.

In an alternative embodiment, n, defined as the arithmetic mean of k, is in the range from 1.10 to 1.75, preferably from 1.15 to 1.50, further preferably from 1.20 to 1.45 and more preferably from 1.20 to 1.40 (including range limits).

$$n = \frac{\sum_{i=1}^{max} k_i \cdot x_i}{\sum_{i=1}^{max} x_i}$$

The phosphazenes and preparation thereof are described, for example, in EP 728 811 A2, DE 1961668 A and WO 97/40092 A1.

The oligomer compositions in the respective blend samples, even after compounding, can be detected and quantified by means of $^{31}P$ NMR (chemical shift; δ trimer: 6.5 to 10.0 ppm; δ tetramer: −10 to −13.5 ppm; δ higher oligomers: −16.5 to −25.0 ppm).

The polycarbonate-based compositions used in accordance with the invention contain 7% by weight to 15% by weight of cyclic phosphazene, preferably 8% by weight to 13% by weight, more preferably 10% by weight to 13% by weight.

Component D

Components D in the context of the invention are selected from the group of the mono- and oligomeric phosphoric and phosphonic esters, and it is also possible to use mixtures of multiple components selected from one or more than one of these groups as component D.

Mono- and oligomeric phosphoric and phosphonic esters used in accordance with the invention are phosphorus compounds of the general formula (V)

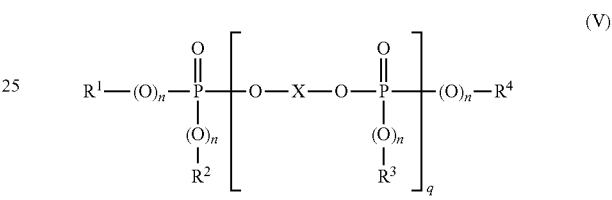

(V)

where $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30 and X is a mono- or polycyclic aromatic radical having 6 to 30 carbon atoms or a linear or branched aliphatic radical having 2 to 30 carbon atoms, each of which may be substituted or unsubstituted, and bridged or unbridged.

Preferably, $R^1$, $R^2$, $R^3$ and $R^4$ are independently branched or unbranched $C_1$- to $C_4$-alkyl, phenyl, naphthyl or $C_1$- to $C_4$-alkyl-substituted phenyl. In the case of aromatic $R^1$, $R^2$, $R^3$ and $R^4$ groups, these may in turn be substituted by halogen and/or alkyl groups, preferably chlorine, bromine and/or $C_1$- to $C_4$-alkyl, branched or unbranched. Particularly preferred aryl radicals are cresyl, phenyl, xylenyl, propylphenyl or butylphenyl, and the corresponding brominated and chlorinated derivatives thereof.

X in the formula (V) preferably derives from diphenols. X in formula (V) is more preferably

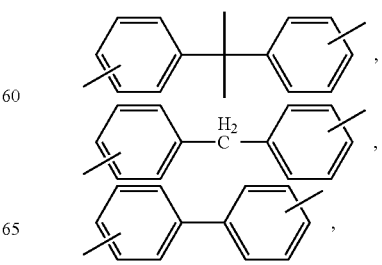

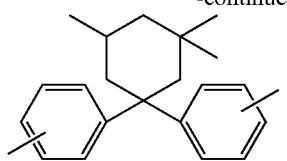

or the chlorinated and/or brominated derivatives thereof.
Preferably, X (together with the adjoining oxygen atoms) derives from hydroquinone, bisphenol A or diphenylphenol. Likewise preferably, X derives from resorcinol. More preferably, X derives from bisphenol A.

n in the formula (V) is preferably 1.

q is preferably 0 to 20, more preferably 0 to 10, and in the case of mixtures has average values of 0.8 to 5.0, preferably 1.0 to 3.0, more preferably 1.05 to 2.00, and especially preferably of 1.08 to 1.60.

A phosphorus compound of the general formula (V) which is present with preference is a compound of the formula (V')

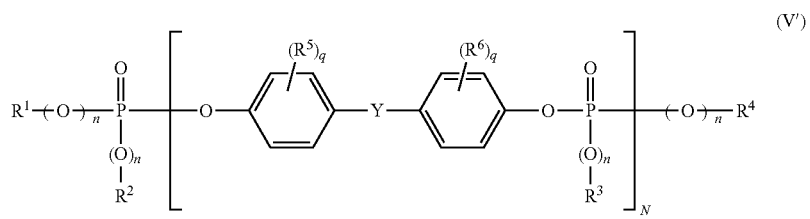

where
$R^1$, $R^2$, $R^3$ and $R^4$ are each independently a linear or branched $C_1$- to $C_8$-alkyl radical and/or optionally linear or branched alkyl-substituted $C_5$- to $C_6$-cycloalkyl radical, $C_6$- to $C_{10}$-aryl radical or $C_7$- to $C_{12}$-aralkyl radical,
n is independently 0 or 1,
q is independently 0, 1, 2, 3 or 4,
N is a number from 1 to 30,
$R_5$ and $R_6$ are independently a linear and branched $C_1$- to $C_4$-alkyl radical, preferably methyl radical, and
Y is linear or branched $C_1$- to $C_7$-alkylidene, a linear or branched $C_1$- to $C_7$-alkylene radical, $C_5$- to $C_{12}$-cycloalkylene radical, $C_5$- to $C_{12}$-cycloalkylidene radical, —O—, —S—, —SO—, $SO_2$ or —CO—.

Phosphorus compounds of the formula (V) are especially tributyl phosphate, triphenyl phosphate, tricresyl phosphate, diphenyl cresyl phosphate, diphenyl octyl phosphate, diphenyl 2-ethylcresyl phosphate, tri(isopropylphenyl) phosphate, resorcinol-bridged oligophosphate and bisphenol A-bridged oligophosphate. The use of oligomeric phosphoric esters of the formula (V) which derive from bisphenol A is especially preferred.

Most preferred as component D is bisphenol A-based oligophosphate of formula (Va)

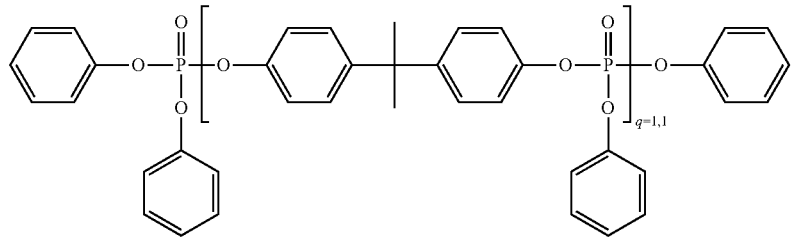

Particular preference is also given to oligophosphates analogous to the formula (Va) in which q is from 0 to 5, further preferably from 1.0 to 1.2.

The phosphorus compounds according to component D are known (cf., for example, EP 363 608 A1, EP 640 655 A2) or can be prepared in an analogous manner by known methods (e.g. Ullmanns Enzyklopädie der technischen Chemie [Ullmann's Encyclopedia of Industrial Chemistry], vol. 18, p. 301 ff. 1979; Houben-Weyl, Methoden der organischen Chemie, vol. 12/1, p. 43; Beilstein vol. 6, p. 177).

Preferably, mixtures having the same structure and different chain length are used, in which case the q value reported is the mean q value. The mean q value is determined by determining the composition of the phosphorus compound mixture (molecular weight distribution) by means of high-pressure liquid chromatography (HPLC) at 40° C. in a mixture of acetonitrile and water (50:50) and using this to calculate the mean values of q.

The compositions used in accordance with the invention contain up to 11% by weight, preferably 2% to 10% by weight, more preferably 5% to 10% by weight, of phosphorus compound according to component B, most preferably bisphenol A-based oligophosphate of formula (Va), based on the overall composition.

Component E

The compositions used in accordance with the invention may also comprise one or more stabilizers from the group of alkyl phosphate, ethylenediaminetetraacetic acid and/or citric acid.

Alkyl phosphates suitable in accordance with the invention are, for example, mono-, di- and trihexyl phosphate, triisooctyl phosphate and trinonyl phosphate. The alkyl phosphate used is preferably triisooctyl phosphate (tris-2-ethylhexyl phosphate). It is also possible to use mixtures of various mono-, di- and trialkyl phosphates.

Preferably, only one of the abovementioned compounds is present as stabilizer.

If alkyl phosphate, preferably triisoctyl phosphate, is present as stabilizer, the proportion of this stabilizer in the composition used in accordance with the invention is 0 to 400 ppm, based on the overall composition.

If ethylenediaminetetraacetic acid is present as stabilizer, the proportion, of this stabilizer in the , composition used in accordance with the invention is likewise 0 to 400 ppm, based on the overall composition.

If citric acid is present as stabilizer, the proportion of this stabilizer in the composition used in accordance with the invention is 0 to 0.2% by weight, based on the overall composition.

A significant task for the stabilizers is to neutralize alkali residues in the polycarbonate-based compositions, such that degradation reactions of the polycarbonate are prevented or at least reduced. If, however, excessive amounts of stabilizer are used, this effect is reversed and the excess acid residues lead to degradation of the polycarbonate. The person skilled in the art will be able to determine a suitable amount without difficulty.

Component F

As well as the polycarbonate, the compositions may also comprise standard additives such as flame retardants, thermal stabilizers, UV stabilizers, IR stabilizers, demoulding agents, flow auxiliaries, antistats, impact modifiers, colourants and/or fillers as further additives. Suitable customary additives for polycarbonate compositions are described, for example, in the "Additives for Plastic Handbook", John Murphy, Elsevier, Oxford 1999 or in the "Plastics Additives Handbook", Hans Zweifel, Hanser, Munich 2001.

"Further additives" do not include talc, any cyclic phosphazene, any phosphorus compound of the general formula (V) or any stabilizer selected from the group consisting of alkyl phosphate, ethylenediaminetetraacetic acid and/or citric acid, since these are already described as components B to E.

Preferably, the compositions used in accordance with the invention comprise, as further flame retardant, at least one organic flame retardant salt selected from the group consisting of alkali metal and/or alkaline earth metal salts of aliphatic and aromatic sulphonic acid, sulphonamide and/or sulphonimide derivatives, more preferably in an amount of up to 1% by weight. Preference is given to sodium or potassium perfluorobutanesulphonate, sodium or potassium perfluorooctanesulphonate, sodium or potassium diphenylsulphonesulphonate. Preference is further given to potassium nonafluorobutane-l-sulphonate and sodium or potassium diphenylsulphonesulphonate. Potassium nonafluoro-1-butanesulphonate is commercially available, inter alia as Bayowet®C4 (from Lanxess, Leverkusen, Germany, CAS No. 29420-49-3), RM64 (from Miteni, Italy) or as 3MTM perfluorobutanesulphonyl fluoride FC-51 (from 3M, USA) . Mixtures of the salts mentioned are likewise suitable. Potassium nonafluoro-1-butanesulphonate is used with particular preference.

Preferably, the compositions according to the invention do not comprise any additional further flame retardants. The compositions according to the invention are free of fluorine-containing anti-dripping agents, for instance of PTFE (polytetrafluoroethylene) or coated PTFE/SAN (styrene-acrylonitrile).

The amount of further additives is 0% to 10% by weight, preferably up to 5% by weight, more preferably 0.01% to 3% by weight, based on the overall composition.

In a preferred embodiment, the compositions consist at most of components A to F.

The polycarbonate compositions comprising components A to C and optionally D to F are produced by standard methods of incorporation by combining, mixing and homogenizing the individual constituents, and the homogenization in particular preferably takes place in the melt with application of shear forces. The combining and mixing prior to the melt homogenization is preferably effected using powder premixes.

It is also possible to use premixes of pellets or pellets and powders with the polycarbonates.

Also usable are premixes that have been produced from solutions of the mixture components in suitable solvents, in which case it is optionally possible to homogenize in solution and to remove the solvent thereafter.

In particular, additives for the composition according to the invention can be introduced into the polycarbonate by known methods or as a masterbatch.

In this context, the composition according to the invention can be combined, mixed and homogenized in standard apparatuses such as screw extruders (for example twin-screw extruders (TSE)), kneaders or Brabender or Banbury mills. It is also possible to premix individual components and then to add the remaining starting materials singly and/or likewise in a mixture.

Fibre Material

There may be a wide variety of different chemical structures of the fibres of the fibre material. The fibre materials have a higher softening or melting point than the thermoplastic material present in each case.

The fibre material used has preferably been coated with suitable sizes.

The fibre material is preferably in the form of a weave or knit or in the form of endless fibres, more preferably in the form of endless fibres.

The term "endless fibre" in the context of the invention should be regarded as a delimitation from the short or long fibres that are likewise known to the person skilled in the art. Endless fibres generally extend across the entire length of the layer of fibre composite material. The derivation of the term "endless fibre" is that these fibres are present in wound form on a roll and are unwound and impregnated with plastic during the production of the individual fibre composite material layers, such that, with the exception of occasional fracture or roll changing, their length typically corresponds essentially to the length of the fibre composite material layer produced.

Examples of fibre materials are inorganic materials such as a wide variety of different kinds of silicatic and nonsilicatic glasses, carbon, basalt, boron, silicon carbide, metals, metal alloys, metal oxides, metal nitrides, metal carbides and silicates, and organic materials such as natural and synthetic polymers, for example polyacrylonitriles, polyesters, ultrahigh-draw polyamides, polyimides, aramids, liquid-crystalline polymers, polyphenylene sulphides, polyether ketones, polyether ether ketones, polyetherimides. Preference is given to high-melting materials, for example glasses, carbon, aramids, basalt, liquid-crystal polymers, polyphenylene sulphides, polyether ketones, polyether ether ketones and polyether imides. Particularly preferred fibre materials are glass fibres or carbon fibres, in the form of endless fibres and in the form of weaves and knits, particular preference being given to endless glass fibres or endless carbon fibres. The endless fibres especially extend essentially across the entire length of the layer of fibre composite material.

"Unidirectional" in the context of the invention is that the endless fibres are aligned essentially unidirectionally, i.e. point in one direction in terms of their length and hence have the same running direction. "Essentially unidirectional" means here that a deviation in the fibre running direction of up to 5% is possible. Preferably, however, the deviation in the fibre running direction is well below 3%, more preferably well below 1%.

A layer of fibre material, also referred to as fibre layer, is understood to mean a flat layer which is formed by fibres arranged essentially in a plane. The fibres may be bonded to one another by virtue of their position, for example via a weave-like arrangement of the fibres. In addition, the fibre layer may also include a proportion of resin or another adhesive in order to bind the fibres to one another. The fibres may alternatively also be unbonded. This is understood to mean that the fibres can be detached from one another without expenditure of any significant force. The fibre layer may also have a combination of bonded and unbonded fibres. At least one side of the fibre layer is embedded into the polycarbonate-based compositions used in accordance with the invention as matrix material. This is understood to mean that the fibre layer is surrounded at least on one side, preferably on both sides, by the polycarbonate-based composition. The outer edge of the fibre composite material or of the multilayer composite material is preferably formed by the matrix composed of polycarbonate-based composition.

Preferred Properties of the Composite Material

In the case of endless fibres as fibre material, the inner layers of fibre composite material may have essentially the same orientation and the orientation thereof relative to the outer layers of fibre composite material may be rotated by 30° to 90°, wherein the orientation of one layer of fibre composite material is determined by the orientation of the unidirectionally aligned fibres present therein.

In a preferred embodiment, the layers are arranged in alternation. In this case, the outer layers are in a 0° orientation. It has been found to be of particular practical relevance when the inner layers of fibre composite material have the same orientation and their orientation is rotated by 90° relative to the outer layers of fibre composite material. Alternatively, it is possible to rotate the inner layers by 30°, 40°, 50°, 60°, 70° or 80° relative to the outer layer. The orientation in each case may deviate from the guide values mentioned by ±5°, preferably by ±3°, more preferably by ±1°. "Alternating" means that the inner layers are each arranged in an alternating manner by an angle of 90° or an angle of 30° to 90°. The outer layers are in a 0° orientation in each case. The angles may each be varied from 30° to 90° per layer.

In a further preferred embodiment, at least some of the layers have the same orientation and at least some other layers are rotated by 30° to 90°. In this case, the outer layers are in a 0° orientation.

In a further preferred embodiment, the inner layers have the same orientation and their orientation is rotated by 30° to 90° relative to the outer layers of fibre composite material, and the outer layers are present in a 0° orientation relative thereto.

These preferred embodiments are especially suitable for endless fibres.

In the case of weaves, the layers of fibre composite materials are stacked alternately in warp direction)(0° and weft direction (90°), or at the above-specified angles.

In particular embodiments, the multilayer composite material comprises six, preferably five, especially four, more preferably three, inner layers of fibre composite material. However, the multilayer composite material according to the invention may also comprise two or more than six, for example seven, eight, nine, ten or more than ten inner fibre composite material layers.

There is in principle no limit to the number of fibre layers in a fibre composite material. It is therefore also possible for two or more fibre layers to be arranged one on top of another. Two fibre layers one on top of another may each be embedded individually into the matrix material, such that they are each surrounded by the matrix material on either side. In addition, two or more fibre layers may also lie directly one on top of another, such that their entirety is surrounded by the matrix material. In this case, these two or more fibre layers may also be regarded as one thick fibre layer. In one embodiment of the fibre composite material, the fibre layer takes the form of a unidirectional fibre layer, of a woven fabric or laid scrim layer, of a loop-drawn knit, loop-formed knit or braid, or of long fibres in the form of random fibre mats or nonwoven tapes, or combinations thereof.

A preferred embodiment of a multilayer composite material according to the invention comprises eight layers, and thus two outer and six inner layers. The inner layers comprise unidirectionally oriented endless fibres as fibre material, preferably carbon fibres. The two outer layers of the inner layers have a 0° orientation. The four innermost layers of the inner layers all have the same orientation and are rotated by 90° thereto. Applied as the outer layer in each case is a layer of composite material which, rather than unidirectionally oriented endless fibres, comprises a fibre weave. The matrix material of the inner layers of the composite material is a composition as described above, especially one emphasized as preferred. More preferably, the matrix material of all the layers of fibre composite material having endless fibres is the same. The fibre volume content in the six inner layers of composite material is preferably 40%-50% by volume and is preferably the same in these layers.

The multilayer composite materials according to the invention can have a metallic appearance, metallic sound and metallic tactile properties, and metal-like mechanical properties. The multilayer composite materials of the invention also have the advantage that they can be produced inexpensively and that they are extremely lightweight because of the plastic used therein. What is also advantageous about the multilayer composite materials according to the invention is that the configuration, for example of a housing part, can be effected in a particularly simple and flexible manner owing to the thermoformability of the multilayer composite materials.

In one particular embodiment of the invention, all fibre composite material layers of the multilayer composite material are bonded face-to-face, wherein the fibre material is aligned unidirectionally within the respective layer and is embedded in the matrix material. It is optionally possible, in this embodiment, for further material layers to be present between the layers of the fibre composite material, for example finishing layers, for example paint layers, typically based on urethane-based and acrylate-based paint systems, in single-layer or multilayer form, which can be hardened thermally or by means of UV radiation (the surfaces, prior to finishing, can optionally be correspondingly pretreated, activated, for example by means of plasma or flame treatment, or cleaned). It is also possible for thin films to be applied to one or both sides of a multilayer construct composed of several layers of composite material each with unidirectionally oriented fibres as fibre material, in order to provide a particularly homogeneous surface for subsequent painting. These films may or may not have been rendered flame-retardant.

In a further preferred embodiment, veneer is applied as outer layer on one or both sides of the multilayer construct.

In principle, the multilayer composite material according to the invention, as well as the layers of fibre composite material, may also comprise one or more further layers. Examples of these include further layers of a plastic which may be identical to or different from the plastics matrix used in the layers of fibre composite material. These plastics layers may in particular also comprise fillers which are distinct from the fibre materials provided in accordance with the invention. The multilayer composite material according to the invention may additionally also comprise adhesive layers, woven layers, nonwoven layers or surface enhancement layers, for example paint layers. These further layers may be present between inner and outer layers of fibre composite material, between a plurality of inner layers of fibre composite material and/or atop one or both of the outer layers of fibre composite material. However it is preferable when the outer layers of fibre composite material and the at least one inner layer of fibre composite material are bonded to one another such that there are no further layers therebetween.

The multilayer composite material may also be composed exclusively of fibre composite material layers according to the invention in which the fibres are unidirectionally aligned within the respective layer and embedded into a polycarbonate-based plastics matrix, wherein one or more surface enhancement layers, for example paint layers, may optionally be present atop one or both of the outer layers of fibre composite material.

The individual layers of fibre composite material may have a substantially identical or different construction and/or orientation.

A "substantially identical construction" of the layers of fibre composite material is understood in the context of the invention to mean that at least one feature from the group comprising chemical composition, fibre volume content and layer thickness is identical.

"Chemical composition" is understood to mean the chemical composition of the polymer matrix of the fibre composite material and/or the chemical composition of the fibre material, such as endless fibres.

In a preferred embodiment of the invention, the outer layers of fibre composite material have a substantially identical construction in terms of their composition, their fibre volume content and their layer thickness.

In a preferred embodiment of the invention, the multilayer composite material has a total thickness of 0.5 to 2 mm, preferably 0.8 to 1.8 mm, especially 0.9 to 1.2 mm. Practical tests have shown that the multilayer composite material according to the invention can achieve excellent mechanical properties even at these low thicknesses.

It has been found to be particularly advantageous when the sum total of all inner layers of fibre composite material has a total thickness of 200 82 m to 1200 μm, preferably 400 μm to 1000 μm, more preferably 500 μm to 750 μm.

It is further advantageous in the context of the invention when the thickness of each of the two outer layers of fibre composite material is 100 to 250 μm, preferably 120 μm to 230 μm, more preferably 130 μm to 180 μm.

Fibre composite material layers that are preferred in accordance with the invention have a fibre volume content of ≥30% by volume and ≤60% by volume, preferably ≥35% by volume and ≤55% by volume, more preferably of ≥37% by volume and ≤52% by volume. If the fibre volume content is less than 30% by volume then the mechanical properties of the resulting fibre composite material under a point load are often suboptimal, i.e. the fibre composite material cannot adequately withstand a point load and in some cases is even pierced. A fibre volume content exceeding 60% by volume likewise results in a deterioration in the mechanical properties of the fibre composite material. Without wishing to be bound to any scientific theories, the reason for this seems to be that the fibres can no longer be adequately wetted in impregnation at such high fibre volume contents, leading to an increase in air inclusions and to increased occurrence of surface defects in the fibre composite material.

In one embodiment of the multilayer composite material, the volume content of the fibre material in the total volume of the multilayer composite material is in the range from 30% to 60% by volume, preferably in the range of 40% to 55% by volume.

In one embodiment of the invention, the outer layers of fibre composite material have a fibre volume content of not more than 50% by volume, preferably not more than 45% by volume, especially not more than 42% by volume.

In a particular embodiment of the invention, the outer layers of fibre composite material have a fibre volume content of at least 30% by volume, preferably at least 35% by volume, especially at least 37% by volume.

These upper and lower limits for the fibre volume content are associated with particularly advantageous mechanical properties as described further up. They can be combined with other stated properties of the fibre composite material or multilayer composite material.

In a further particular embodiment of the invention, the outer layers of fibre composite material have a lower volume content of fibres, based on the total volume of the layer of fibre composite material, than the at least one inner layer of fibre composite material.

The inner layers of fibre composite material can have a fibre volume content of 40% to 60% by volume, preferably 45% to 55% by volume, more preferably 48% to 52% by volume, based on the total volume of the layer of fibre composite material.

"% by volume" is understood here to mean the proportion by volume (% v/v), based on the total volume of the layer of fibre composite material.

The preferably at least three layers of fibre composite material in the multilayer composite material according to the invention preferably have essentially no voids, in particular essentially no air inclusions.

"Essentially no voids" in one embodiment means that the void content of the at least three layers of fibre composite material in the multilayer composite material according to the invention is below 2% by volume, in particular below 1% by volume, more preferably below 0.5% by volume.

The void content of a layer of fibre composite material or of the multilayer composite material can be determined in different ways which are regarded as generally accepted. For example, the void content of a test specimen can be determined by the resin ashing test, in which a test specimen is exposed for example to a temperature of 600° C. for 3 hours in an oven in order to incinerate the resin which encloses the fibres in the test specimen. The mass of the fibres thus exposed can then be determined in order to arrive after a further computational step at the void content of the test specimen. Such a resin ashing test can be performed as per ASTM D 2584-08 to determine the individual weights of the fibres and of the polymer matrix. The void content of the test specimen can be determined therefrom in a further step by utilizing the following equation 1:

$$Vf=100* (\rho t-\rho c)/\rho t \qquad \text{(equation 1)}$$

where
Vf is the void content of the sample in [%];
$\rho c$ is the density of the test specimen, determined by liquid or gas pycnometry for example;
$\rho t$ is the theoretical density of the test specimen determined as per the following equation 2:

$$\rho t=1/[Wf/\rho f+Wm/\rho m] \qquad \text{(equation 2)}$$

$\rho m$ is the density of the polymer matrix (for example for an appropriate crystallinity);
$\rho f$ is the density of the fibres used;
Wf is the proportion by weight of the fibres used and
Wm is the weight fraction of the polymer matrix.

Alternatively, the void content can be determined by chemical leaching of the polymer matrix out of the test specimen as per ASTM D 3171-09. The resin ashing test and the chemical dissolution method are more suitable for glass fibres which are generally inert to melting or chemical treatment. Further methods for more sensitive fibres are indirect computation of the void content by the densities of the polymer, of the fibres and of the test specimen as per ASTM D 2734-09 (method A), wherein the densities can be determined as per ASTM D792-08 (method A). Furthermore, it is also possible to employ image processing programs, grid templates or defect counting to evaluate the void content of an image recording determined by conventional microscopy.

A further way to determine void content is the thickness differential method which comprises determination of the differential in layer thickness between a theoretical component thickness and the actual component thickness for known basis weights and densities of polymer and fibre. Computation of the theoretical component thicknesses assumes no voids are present in the construction and complete wetting of the fibres with polymer. Relating the thickness difference to the actual component thickness affords the percentage void content. These thicknesses may be measured with a micrometer for example. For this method, error-minimized results can preferably be determined by determining the void content on components composed of a plurality of individual layers, preferably more than 4 layers, more preferably more than 6 layers and very particularly preferably more than 8 layers.

All the processes described above lead to comparable results when a corresponding standard is tested as well.

Most preferably, the layers of fibre composite material in the multilayer composite material according to the invention have no voids, especially no inclusions of air.

Production of the Fibre Composite Materials and the Multilayer Composite Materials The invention further provides a process for producing the fibre composite material according to the invention or the multilayer composite material.

The fibre composite material layers of the multilayer composite material according to the invention can be produced by the customary processes for producing fibre composite materials that are known to one skilled in the art.

For the production of the fibre composite materials or multilayer composite materials according to the invention, it is possible to use various production methods. First of all, it is possible to make a fundamental distinction as to whether the fibre composite material or the multilayer composite material consists, for example, of unidirectional fibre layers, weave layers, random fibre layers or of combinations thereof, it being possible to introduce unidirectional fibres into the composite material layers either in the form of a semifinished product (e.g. laid scrim) or directly as a pure fibre strand. In the case of the latter approach, the fibre strands are generally first impregnated at least in one layer with the thermoplastic resin (the fibre composite material), in order then to be pressed to form a multilayered system (laminate), the multilayer composite material, for which there are various methods of impregnation. If the composite sheet is produced from semifinished fibre products (weaves, scrims, random fibres etc.), the prior art likewise indicates various means by which fibres and matrix can be combined. Standard methods are, for example, the process with the aid of powder prepregs or what is called the film stacking process. The film stacking process can preferably be used for the production of the above-described fibre composite materials. This involves alternate layering of films and weave layers, where the basis weight of the weave and thickness of the films, for example, can be matched to one another so as to obtain a desired fibre volume content.

In a preferred embodiment of the invention, the fibre composite material layers of the multilayer composite material are producible by applying a molten polycarbonate-based plastic to an endless fibre tape preheated to above the glass transition temperature of the plastic under pressure-shear vibration. Such a production process is described in DE 10 2011 005 462 B3.

An "endless fibre tape" is understood in accordance with the invention to mean a plurality of rovings that have been brought together, the rovings being untwisted bundles composed of many endless fibres.

The preferred process for producing a layer of fibre composite material of the multilayer composite material especially comprises the following steps:
- providing an endless fibre tape and conveying the endless fibre tape along a processing line,
- preheating the endless fibre tape to a processing temperature higher than the glass transition temperature of the polycarbonate-based plastic,
- applying the molten polycarbonate-based plastic over an entire width of the endless fibre tape onto one surface of the endless fibre tape,
- applying a pressure on to the endless fibre tape perpendicular to the plane of the tape after the application of the polycarbonate-based plastic, wherein the application of pressure is effected with at least one pressing ram with simultaneous application of shear vibration to the pressing ram with a vibratory motion component in the tape plane and transverse to a tape running direction,
- holding the endless fibre tape within a processing temperature range above the glass transition temperature of the polycarbonate-based plastic at least until the application of pressure-shear vibration has been terminated.

Melt application with the following application of pressure-shear vibration for as long as the raw fibre tape is at a temperature above the glass transition temperature of the polycarbonate-based plastic results in an efficacious incorporation of the plastics melt into the entire fibre volume structure of the raw fibre tape.

It is preferable not to exceed an endless fibre tape temperature of 380° C. The temperature of the endless fibre tape is typically between 180° C. and 280° C., preferably between 200° C. and 260° C., more preferably to 240° C., especially preferably between 210° C. and 230° C., in particular 220° C. Where reference is made to heating to above the glass transition temperature of the plastic or holding at above the glass transition temperature of the plastic, this means heating to a temperature at which the plastic is in a fully molten state. The glass transition temperature of the plastic is determined as per DIN EN ISO 17025. A difference between the fibre temperature and the melt temperature on contacting of the plastics melt with the endless fibre tape is in the range from 60° C. to 120° C., preferably from 70° C. to 110° C., more preferably from 80° C. to 100° C.

The application of pressure-shear vibration causes efficient expulsion of gas volumes still present within the raw fibre tape. The process may be performed in continuous fashion. The holding of the endless fibre tape at a temperature above the glass transition temperature of the plastic ensures that the polycarbonate-based plastic does not undergo undesired solidification before complete penetration and apportioning within and atop the endless fibre tape. On conclusion of the pressure-shear vibration, the temperature is preferably still kept above the melting temperature of the polymer during a rest interval. Subsequently, the layer of fibre composite material is cooled down in a defined manner. Once the indicated process steps have been performed the produced, impregnated endless fibre tape can be cooled in a defined manner.

The endless fibre tape may comprise a multiplicity of endless fibres. The application of pressure-shear vibration makes it possible to achieve good penetration of the plastic into the fibre tape, i.e. good impregnation, with little, if any, damage to the fibres.

The process can be performed continuously or batchwise.

It is particularly preferable when the process for producing a layer of fibre composite material of the multilayer composite material is run such that the application of the polycarbonate-based plastic to the endless fibre tape is effected while the endless fibre tape is conveyed under ambient atmospheric pressure. Such an application of the plastic avoids complex and inconvenient external sealing of a pressurized application chamber.

It is further preferable to run the process for producing a fibre composite material layer of the multilayer composite material such that the application of pressure-shear vibration to a section of the endless fibre tape after the application of plastic is effected consecutively and repeatedly along the processing line. It is also possible to run the process such that the pressure-shear vibration to a section of the endless fibre tape after plastic is applied from both sides of the tape plane. Repeated application of pressure-shear vibration increases the efficiency of the production process. Transverse motion components of the various devices for application of pressure-shear vibration may be controlled in synchronized opposing fashion, i.e. in a push-pull manner. A rest interval where the raw fibre tape does not have a pressure and/or shear vibration applied to it for a predefined time interval may in each case be provided in a targeted fashion between the consecutive applications of pressure-shear vibration. An application of pressure-shear vibration from both sides may be effected by way of pressure application devices arranged consecutively in the processing line. Alternatively, a simultaneous application of pressure-shear vibration from both sides is possible. The application of pressure-shear vibration from both sides can also be effected with the transverse motion components occurring in synchronized opposing fashion, i.e. in a controlled push-pull manner.

The frequencies of the application of pressure-shear vibration are preferably in the range between 1 Hz and 40 kHz. Amplitudes for the application of shear vibration are typically in the range between 0.1 mm and 5 mm. A pressure of the application of pressure-shear vibration is preferably in the range between 0.01 MPa and 2 MPa.

"Bonding of the layered layers of fibre composite material" is understood in accordance with the invention to mean any process which results in physical bonding of the layered layers of fibre composite material. It is preferable when the bonding of the layered layers of fibre composite material to afford the multilayer composite material is effected by means of pressure and/or temperature, for example by lamination. The pressure employed for bonding of the layered layers of fibre composite material to afford the multilayer composite material may be in the range from 5 to 15 bar, preferably 7 to 13 bar, more preferably 8 to 12 bar. The temperature for bonding of the fibre composite material layers may be 80° C. to 300° C. If a bonding process with heating and cooling zones is employed the temperature for bonding of the fibre composite material layers in the heating zones may be from 220° C. to 300° C., preferably from 230° C. to 290° C., more preferably from 240° C. to 280° C. The temperature in the cooling zones may be from 80° C. to 140° C., preferably from 90° C. to 130° C., more preferably from 100° C. to 120° C.

However, in addition to lamination, adhesive bonding or welding to bond the layered layers of fibre composite material are also possible.

In a preferred embodiment, the bonding of the layered layers of fibre composite material results in layers of fibre composite material bonded face-to-face. "Face-to-face" in this context means that at least 50%, preferably at least 75%, 90%, 95%, 99% or 100% ("uniform" bonding) of the surfaces of two adjacent layers of the fibre composite material that are facing one another are directly bonded to one another. The degree of bonding may be determined in cross sections by microscopy or else determined by the absence of cavities, for example air inclusions, in the fibre composite material.

A preferred process for producing an inventive multilayer composite material composed of at least three inventive layers of fibre composite material comprises the following steps:
 providing at least one inner layer of fibre composite material and two outer layers of fibre composite material, wherein the individual layers of fibre composite material are produced by applying a molten, aromatic polycarbonate-based composition comprising a composition as described above to a raw fibre tape composed of fibre material that has been preheated to above the glass transition temperature of the polycarbonate,
 layering the layers of fibre composite material in the desired orientation relative to one another, based on the orientation of the fibre material,
 bonding the layered layers of fibre composite material to form the multilayer composite material.

Multilayer composite materials can additionally also be produced by means of a static press. This involves alternate layering of films composed of the polycarbonate-based compositions used in accordance with the invention and the weave layers, where the outer layers are each concluded by a film layer.

It is possible to use the inventive layers of fibre composite material to produce broad layers of fibre composite material for demanding fibre composite components where drawing freedom across the entire area is required, especially for bodywork components in motor vehicles. "Broad layers of fibre composite material" means here that the layers of fibre composite material can reach a width of several metres. Typically, the broad layers of fibre composite material have widths of 280 mm to 1800 mm.

An advantageous process for producing very broad layers of fibre composite material is described in WO 2013/098224 A1. This process enables the production of a fibre tape of maximum homogeneity across the entire width in terms of its properties. For this purpose, two or more individual fibre tapes of a defined width, each of which has a filament structure impregnated with the polymer, are combined in a heated pressurization unit, wherein the individual fibre tapes are conveyed alongside one another in an entry region into the heated pressurization unit such that adjacent side chains of the consolidated individual fibre tapes abut one another in joint regions, the individual fibre tapes being conveyed alongside one another are then heated with the heated pressurization unit to a temperature above a melting point of the polymer, where the heating is effected across the entire width of the individual fibre tapes transverse (y) to the conveying direction (x) thereof; then pressure is applied with the heated pressurization unit to the heated individual fibre tapes being conveyed alongside one another; subsequently, the consolidated individual fibre tapes are kept within a processing temperature range above the polymer melting point until the joint regions of the consolidated individual fibre tapes are welded to one another, and then the broad fibre tape composed of the mutually welded individual fibre tapes is cooled down.

Preferably, during the heating, shear vibration is applied to the consolidated individual fibre tapes with the heated pressurization unit, with exertion of a shear force on the individual fibre tapes in the longitudinal direction of a shear force application unit (y), which is at right angles to a conveying direction (x) and at right angles to a tape normal (z). This leads to effective homogeneous distribution of the polymer melt into the whole fibre volume structure of the broad fibre tape. Gas volumes that are still within the individual fibre tapes and especially in the joint region of adjacent individual fibre tapes can be efficiently driven out as a result. The application of shear vibration results in spreading of the individual fibre tapes, which improves wetting of the filaments with the molten polymer matrix.

The spreading may be associated with a decrease in the tape thickness of the broad layer of fibre composite materials produced compared to the tape thickness of the individual fibre tapes.

The pressure unit of the heated pressurization unit is preferably a pressing ram or a roll pair, or alternatively an interval heating press, an isobaric twin belt or membrane press, a calender or a combination of these alternatives.

The process described for production of a broad layer of fibre composite material is conducted continuously or batchwise.

A further advantage of the multilayer composite material according to the invention is that it can be formed into any desired shape., Forming may be achieved by any forming processes known to one skilled in the art. Such forming processes may be effected under the action of pressure and/or heat.

Preferably, the forming is effected with evolution of heat, especially by thermoforming.

In order to obtain better compatibility of the fibre layers and especially of the endless fibres with the thermoplastic matrix material, the fibre layers, especially the endless fibres or weaves/knits, can be surface pretreated with a silane compound. Preferred silane compounds are aminopropyltrimethoxysilane, aminobutyltrimethoxysilane, aminopropyltriethoxysilane, aminobutyltriethoxysilane.

Generally, the fibres can be chemically and/or physically modified by means of sizes in such a way as to establish, for example, the desired degree of binding between fibres and the matrix material in the subsequent production of fibre composite materials from the fibre layers and the matrix material. For this purpose, it is possible to use any sizes known to those skilled in the art, specifically not only the abovementioned silane compounds but also preferably the epoxy resins and derivatives thereof, epoxy esters, epoxy ethers, epoxy urethanes, polyurethane esters, polyurethane ethers, isocyanates, polyimides, polyamides, and any desired mixtures of two or more of the aforementioned compounds. The specific selection of the size material depends on the material for the fibres and the desired strength of binding. The size can be used here, for example, in the form of an aqueous or nonaqueous solution or emulsion, and the size can be attached to the fibres according to the invention by known methods for the sizing of short fibres, for example in a dipping process.

An essential aspect is the fact that the structure-stiffening fibre material and the thermoplastic material enter into a cohesive bond with one another. The cohesive bond is established via the process parameters, especially melt temperature and mould temperature and pressure, and also depends on the abovementioned size.

Preference is given in accordance with the invention to a fibre composite material comprising at least one layer of fibre material embedded into an aromatic polycarbonate-based composition free of PTFE, comprising A) aromatic polycarbonate,
B) 3% by weight to 12% by weight of talc,
C) 8% by weight to 13% by weight of at least one cyclic phosphazene of formula (1)

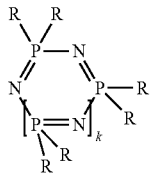
(1)

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, preferably 1 to 8, where the trimer content (k=1) is from 50 to 98 mol %, based on component C, D) 2% to 10% by weight of at least one phosphorus compound of the general formula (V)

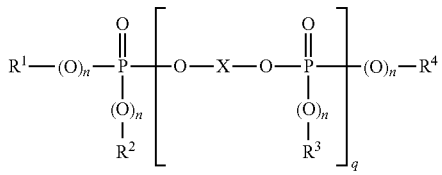
(V)

where $R^1$, $R^2$, $R^3$ and $R^4$ are each independently a $C_1$- to $C_8$-alkyl radical, in each case in each case halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged;

E) 0% to 0.2% by weight of at least one stabilizer selected from the group consisting of alkyl phosphate, ethylenediaminetetraacetic acid and/or citric acid, F) optionally further additives, wherein the fibre material used is carbon fibres or glass fibres in the form of endless fibres.

Particular preference is given in accordance with the invention to a fibre composite material comprising at least one layer of fibre material embedded into an aromatic polycarbonate-based composition free of PTFE, comprising
A) aromatic polycarbonate,
B) 3% by weight to 12% by weight of talc,
C) 10% by weight to 13% by weight of at least one cyclic phosphazene of formula (1)

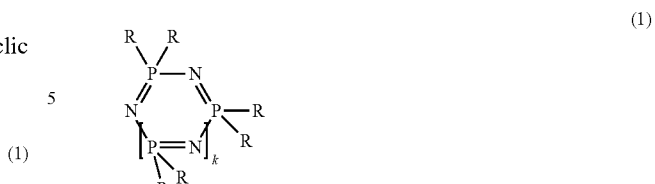
(1)

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, preferably 1 to 8, where the trimer content (k=1) is from 50 to 98 mol %, based on component C, D) 2% to 10% by weight of at least one phosphorus compound of the general formula (V)

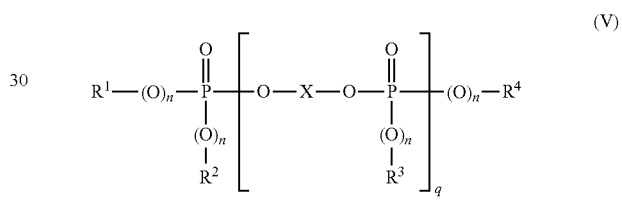
(V)

where $R^1$, $R^2$, $R^3$ and $R^4$ are each independently a $C_1$- to $C_8$-alkyl radical, in each case in each case halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged;

E) 0% to 0.2% by weight of at least one stabilizer selected from the group consisting of alkyl phosphate, ethylenediaminetetraacetic acid and/or citric acid, F) optionally further additives, wherein the fibre material used is carbon fibres or glass fibres in the form of endless fibres.

Very particular preference is given in accordance with the invention to a fibre composite material comprising at least one layer of fibre material embedded into an aromatic polycarbonate-based composition free of PTFE, consisting of
A) aromatic polycarbonate,
B) 3% by weight to 12% by weight of talc,
C) 8% by weight to 13% by weight, preferably 10% to 13% by weight, of at least one cyclic phosphazene of formula (1)

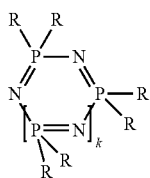

(1)

where

R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical, k is an integer from 1 to 10, where the trimer content (k=1) is from 50 to 98 mol %, based on component C, D) 2% to 10% by weight of at least one phosphorus compound of the general formula (V)

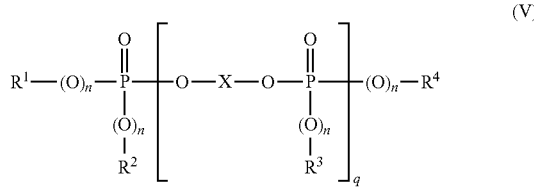

(V)

where $R^1$, $R^2$, $R^3$ and $R^4$ are each independently a $C_1$- to $C_8$a-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen, n is independently 0 or 1, q is an integer from 0 to 30, X is a mono- or polycyclic aromatic radical having 6 to 30 carbon atoms or a linear or branched aliphatic radical having 2 to 30 carbon atoms, each of which may be substituted or unsubstituted, and bridged or unbridged;

E) 0% to 0.2% by weight of at least one stabilizer selected from the group consisting of alkyl phosphate, ethylenediaminetetraacetic acid and/or citric acid, F) optionally further additives selected from the group consisting of thermal stabilizers, UV stabilizers, IR stabilizers, demoulding agents, flow auxiliaries, antistats, impact modifiers, colourants and/or fillers, wherein the fibre material used is carbon fibres or glass fibres in the form of endless fibres.

These embodiments cited as preferred, particularly preferred and very particularly preferred in the three paragraphs above contain no PTFE, and especially no PTFE/SAN either, in the compositions used as matrix material.

More preferably, in the phosphazene, all R radicals=phenoxy radicals; very particular preference is given to using hexaphenoxyphosphazene. The particularly preferred phosphorus compound of component D is

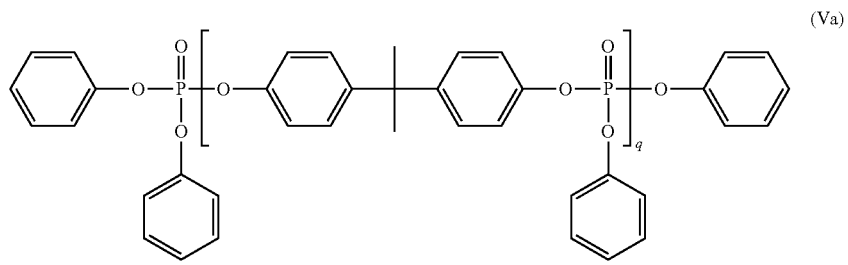

(Va)

where q is from 1.0 to 1.2.

Preference is further given in accordance with the invention to a multilayer composite material comprising at least three mutually superposed layers of fibre composite material as defined above. The fibre volume content of the layers of fibre composite material here is more preferably ≥35% by volume and ≤55% by volume.

The invention further provides a housing or a housing component suitable for use as or employment in a housing of an electronic device, wherein the housing component comprises a multilayer composite material according to the invention.

Housings or housing components obtainable from the composite materials according to the invention—fibre composite materials or multilayer composite materials—are used especially in the IT sector, particularly in computers, ultrabooks, monitors, tablets, phones or mobile phones. For example a housing part may be the back of a mobile phone, the underside of a laptop, the monitor backside of a laptop, the back of a tablet, etc. or else may merely be a constituent of a back of a mobile phone, an underside of a laptop, a monitor backside of a laptop, a back of a tablet, etc. Preferably, the housing component is the monitor backside (a cover) or the underside (d cover) of a laptop. Corresponding housings or housing components can especially be obtained by forming and/or assembly together with further components.

The invention further provides components and structural or trim elements for motor vehicle interiors (walls, cover trim, doors, windows, etc.), parcel shelves, driver's consoles, tables, sound insulation and other insulation materials, vertical surfaces of the outer vehicle skin, outer faces of the underbody, light covers, light diffusers, etc., where the part or structural or trim element comprises a multilayer composite material according to the invention.

Fibre composite materials of the present invention can especially be used for production of thin-wall components (e.g. housing components in data processing, TV housings, notebooks, ultrabooks), where particularly high demands are made on notched impact resistance, flame retardancy and surface quality of the materials used. Thin-wall mouldings are those where wall thicknesses are less than about 3 mm, preferably less than 3 mm, more preferably less than 2.5 mm, yet more preferably less than 2.0 mm, most preferably less than 1.5 mm. In this context "about" is understood to mean that the actual value does not deviate substantially from the stated value, a "non-substantial" deviation being deemed to be one of not more than 25%, preferably not more than 10%.

It is also possible for fibre composite materials according to the invention to be used for production of housing components, for example for domestic appliances, office appliances such as monitors or printers, covering panels for the construction sector, components for the motor vehicles sector or components for the electronics sector.

Figure 2:
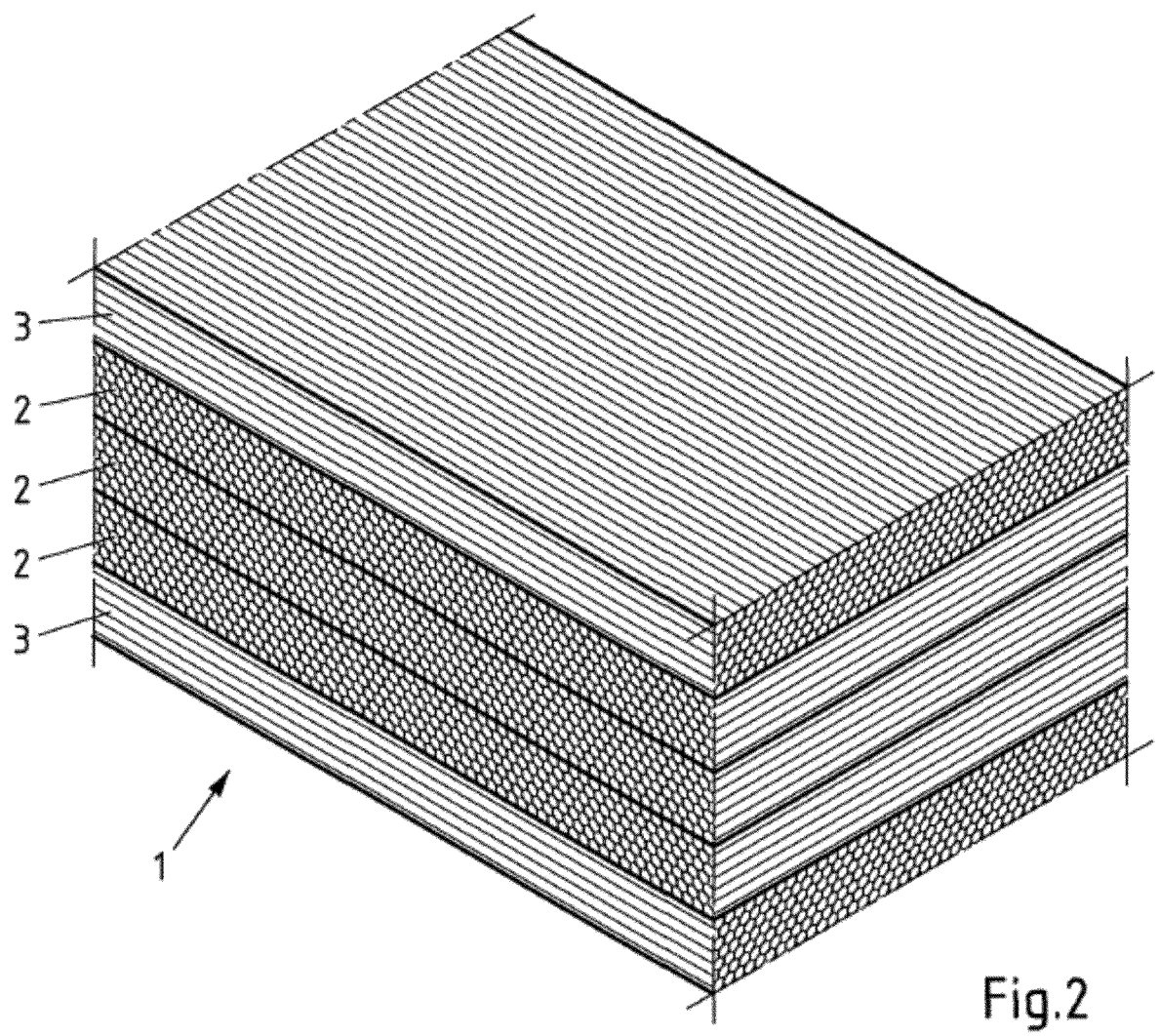
Figure 3A:
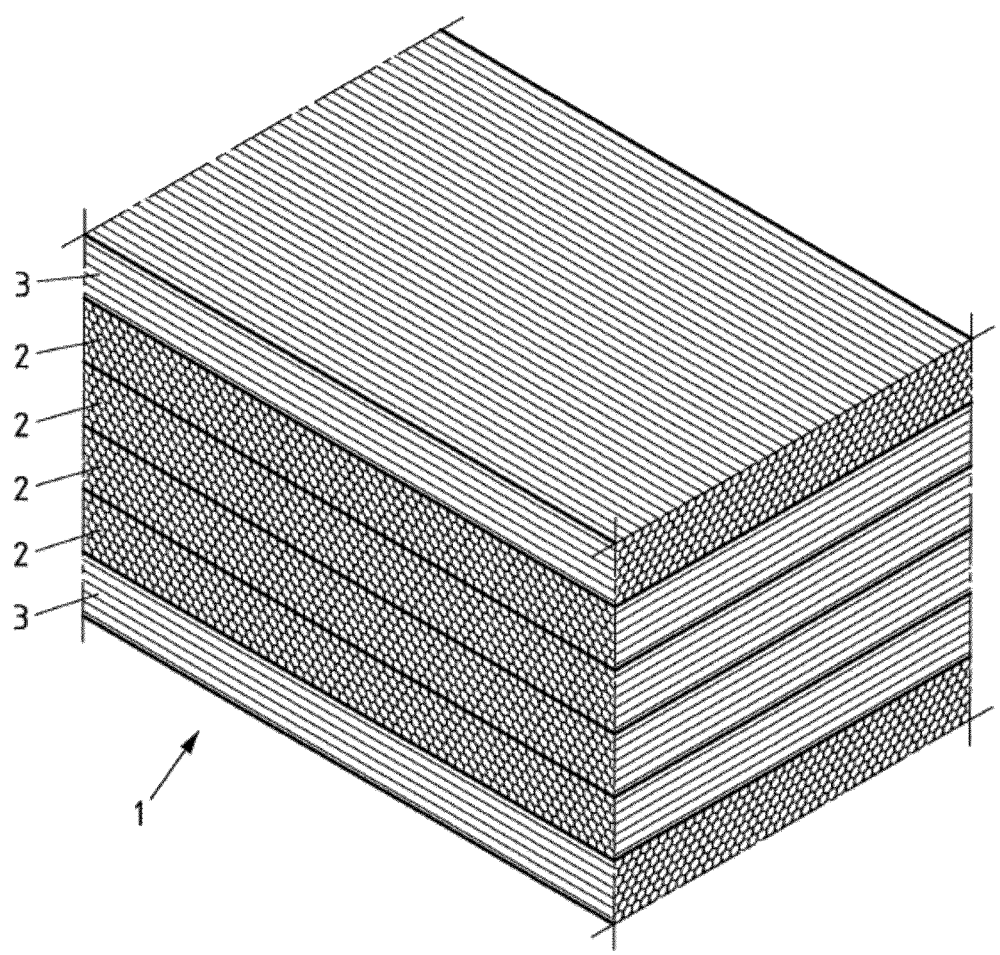
Figure 3B:
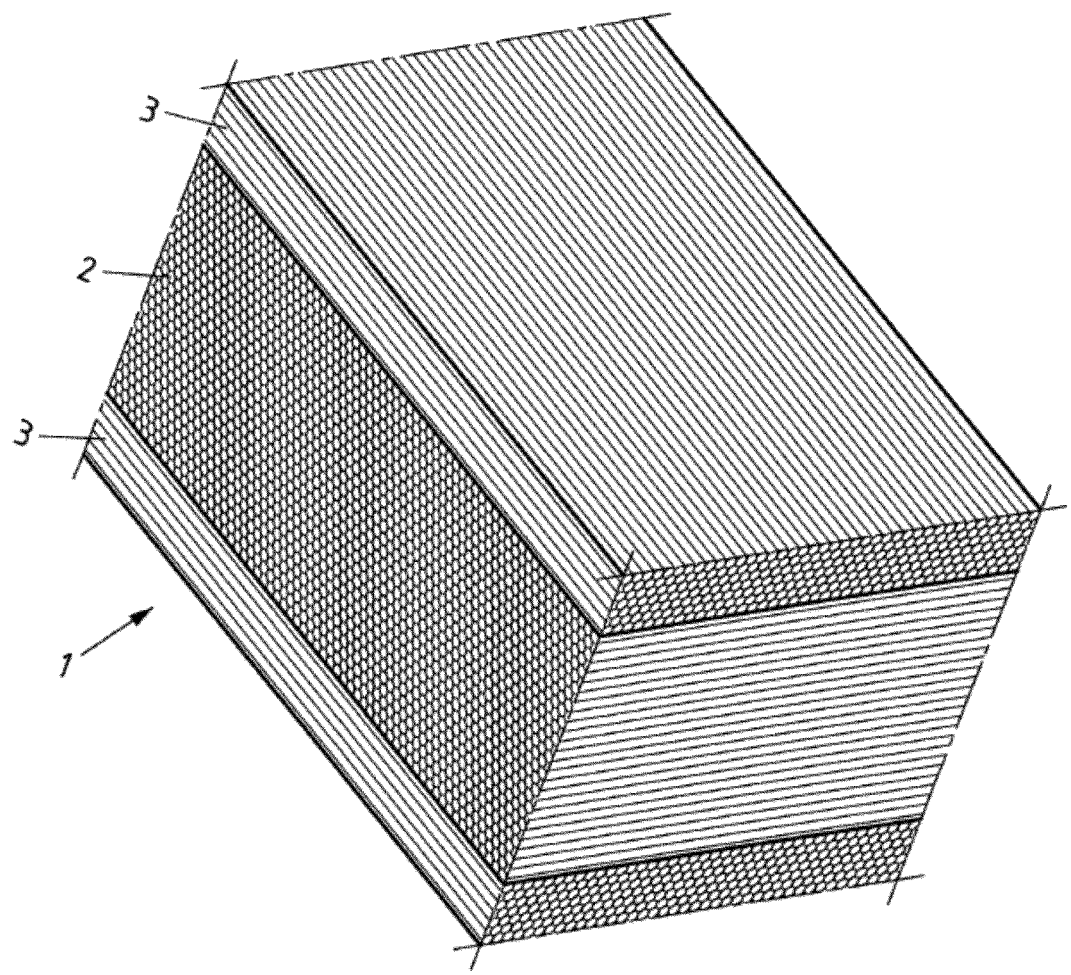

Further details and advantages of the invention will be apparent from the description which follows of the accompanying illustration showing preferred embodiments. The drawings show:

FIG. 1 a schematic and perspective diagram of a multilayer composite material composed of three superposed layers of fibre composite material with enlarged detail, wherein the inner layer is rotated by 90° relative to the outer layers of fibre composite material, FIG. 2 a schematic and perspective diagram of a multilayer composite material composed of five superposed layers of fibre composite material, wherein the inner layers have the same orientation and their orientations are rotated by 90° relative to the outer layers of fibre composite material, FIG. 3a a schematic and perspective diagram of a multilayer composite material composed of six superposed layers of fibre composite material, wherein the inner layers have the same orientation and their orientations are rotated by 90° relative to the outer layers of fibre composite material, FIG. 3b a schematic and perspective diagram of a multilayer composite material composed of three superposed layers of fibre composite material, wherein the inner layer has a greater thickness than the sum of the two outer layers. The thickness ratio of the inner layer to the sum total of the two outer layers is the same as the thickness ratio of the sum of all inner layers to the sum of the two outer layers of the multilayer composite material from FIG. 3a, FIG. 4a a schematic and perspective diagram of a multilayer composite material composed of three superposed layers of fibre composite material and an additional material layer on an outer layer of fibre composite material, FIG. 4b a schematic and perspective diagram of a multilayer composite material composed of three superposed layers of fibre composite material and two additional inner further material layers, for example plastics layers, wherein an inner further material layer is disposed between each outer layer of fibre composite material and the inner layer of fibre composite material.

FIG. 1 shows a detail of a multilayer composite material 1 composed of three superposed layers of fibre composite material 2, 3, wherein the inner layer of fibre composite material 2 is rotated by 90° relative to the outer layers 3 of fibre composite material. The enlarged detail in FIG. 1 shows that each of the layers 2, 3 of the multilayer composite material comprises endless fibres 4 which are unidirectionally aligned within the respective layer and are embedded in polycarbonate-based plastic 5. The orientation of the respective layer of fibre composite material 2, 3 is determined by the orientation of the unidirectionally aligned endless fibres 4 present therein. The endless fibres 4 extend over the entire length/width of the multilayer composite material. The layers 2, 3 are uniformly bonded to one another.

The multilayer composite material 1 as per FIG. 2 is composed of five superposed layers of fibre composite material 2, 3, wherein the inner layers of fibre composite material 2 have the same orientation and their orientation relative to the outer layers of fibre composite material 3 is rotated by 90°.

The multilayer composite material 1 as per FIG. 3a is composed of six superposed layers of fibre composite material 2, 3, wherein the inner layers of fibre composite material 2 have the same orientation and their orientation relative to the outer layers of fibre composite material 3 is rotated by 90°.

Figure 4A:
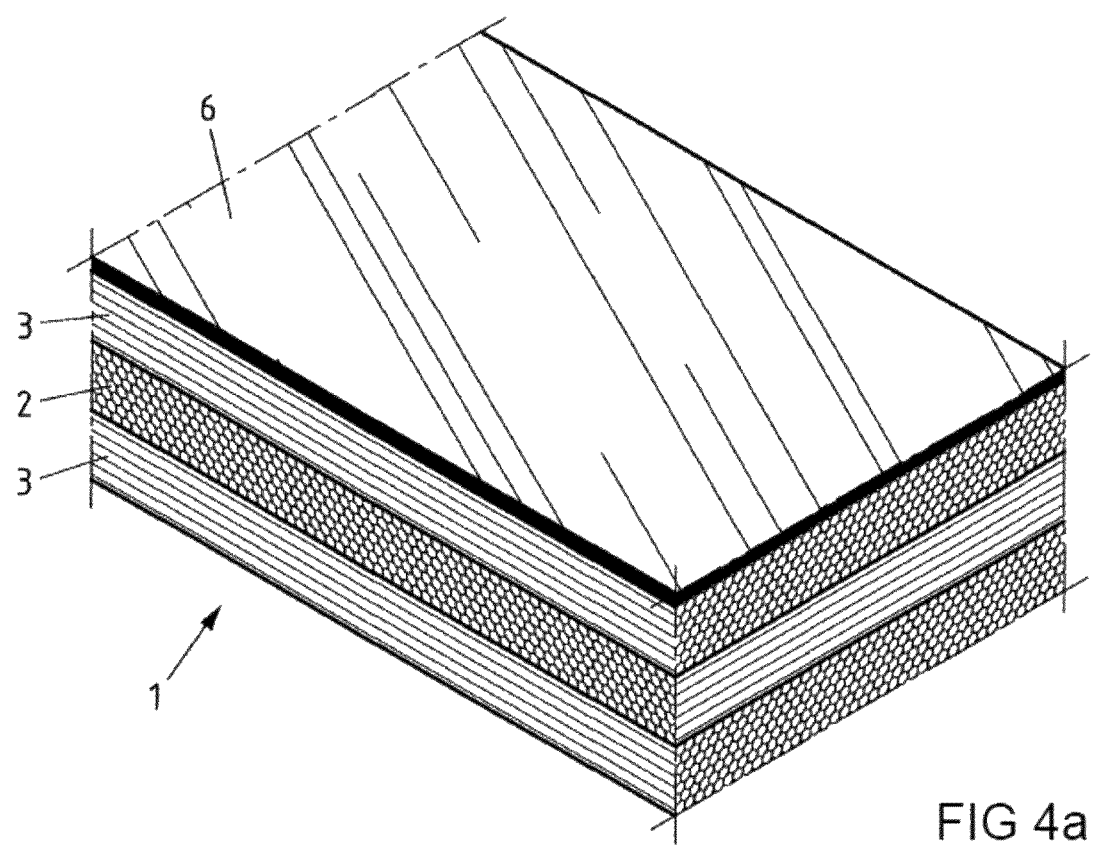

FIG. 3b shows a multilayer composite material 1 composed of three superposed layers of fibre composite material 2, 3, wherein the inner layer 2 has a greater thickness than the sum of the two outer layers 3. FIG. 4a shows the multilayer composite material 1 composed of three superposed layers of fibre composite material 2, 3 as described for FIG. 1 but with an additional further outer material layer 6 atop one of the outer layers of fibre composite material 3. The outer material layer 6 may for example comprise one or more fibre-free plastics layers and/or a thin facing, for example a paint layer or a veneer.

Figure 4B:
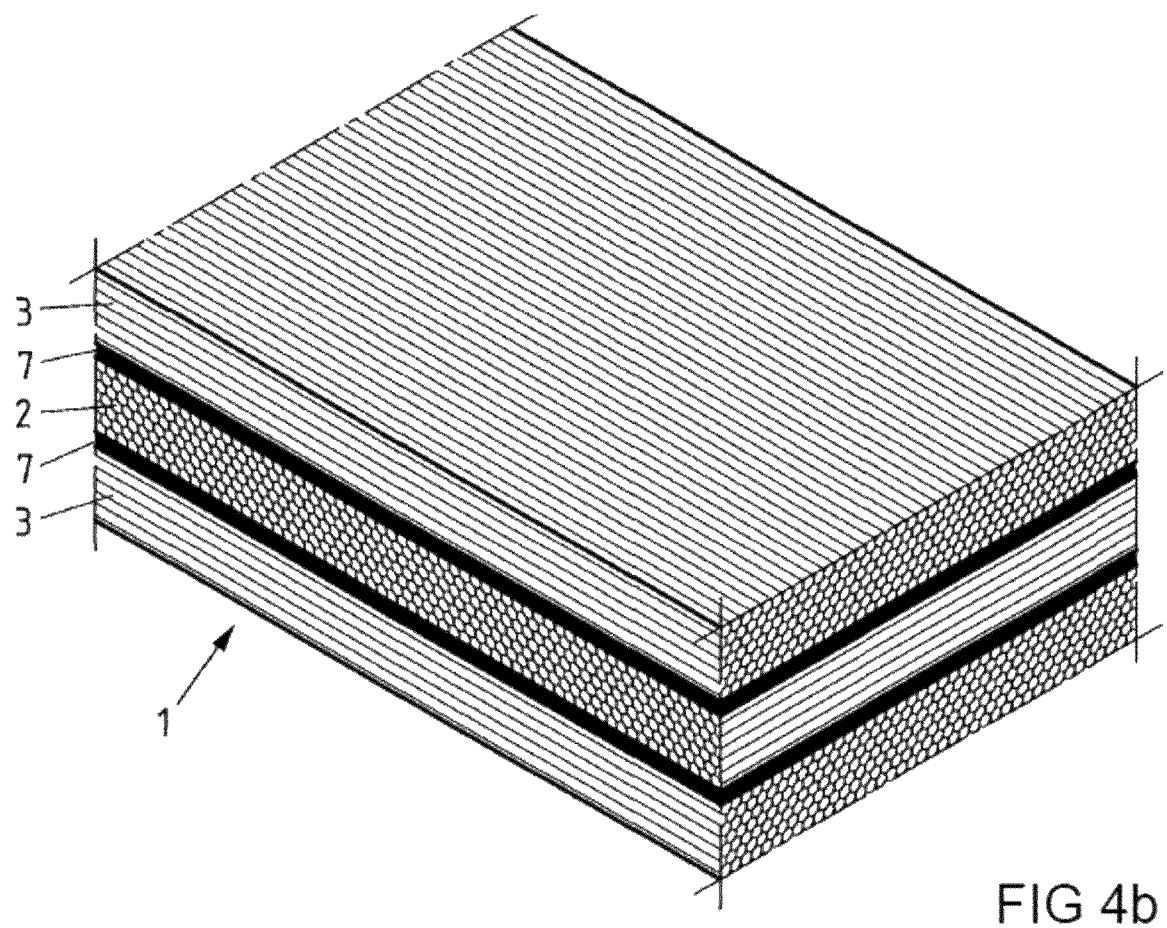

FIG. 4b shows a multilayer composite material 1 composed of three superposed layers of fibre composite material 2, 3 as described for FIG. 1 but with two additional further inner material layers 7, wherein a respective inner further material layer 7 is located between one of the outer layers 3 of fibre composite material and the inner layer 2 of fibre composite material respectively. The further inner material layers 7 may have an identical or different construction and may comprise for example one or more fibre-free plastics layers.

Working Examples

There follows a detailed description of the invention with reference to working examples, and the methods of determination described here are employed for all corresponding parameters in the present invention, in the absence of any statement to the contrary.

Starting Materials:
A-1: Makrolon® 3100 from Covestro Deutschland AG.
A-2: Makrolon® 3108 powder from Covestro Deutschland AG. Linear polycarbonate based on bisphenol A having a melt volume flow rate MVR of 6 $cm^3$/(10 min) (as per ISO 1133:2012-03, at a test temperature of 300° C. and 1.2 kg load).
A-3: Makrolon® 2400 from Covestro Deutschland AG. Linear polycarbonate based on bisphenol A having a melt volume flow rate MVR of 19 $cm^3$/(10 min) (as per ISO 1133:2012-03, at a test temperature of 300° C. and 1.2 kg load).
A-4: Makrolon® 2408 powder from Covestro Deutschland AG. Linear polycarbonate based on bisphenol A having a melt volume flow rate MVR of 19 $cm^3$/(10 min) (as per ISO 1133:2012-03, at a test temperature of 300° C. and 1.2 kg load).
A-5: Makrolon® 2800 from Covestro Deutschland AG. Linear polycarbonate based on bisphenol A having a melt volume flow rate MVR of 9 $cm^3$/(10 min) (as per ISO 1133:2012-03, at a test temperature of 300° C. and 1.2 kg load).
A-6: Linear copolycarbonate formed from bisphenol A and 23.5% by weight of 4,4'-dihydroxybiphenyl with a melt volume flow rate MVR of 8.3 $cm^3$/10 min (according to ISO 1133:2012-03, at a test temperature of 300°

C. and 1.2 kg load) and with a molecular weight $M_w$=24800 g/mol, $M_n$=11600 g/mol, determined by means of gel permeation chromatography (calibration with linear BPA polycarbonate, dichloromethane solvent).

B: HTP Ultra 5 c talc from IMI Fabi S.p.A., Italy.

C: Rabitle FP-110 phenoxyphosphazene from Fushimi Pharmaceutical, Japan.

D: Bisphenol A bis(diphenylphosphate) from Remy GmbH & Co. KG, Germany.

E-1: citric acid from Lanxess AG, Leverkusen.

E-2: triisooctyl phosphate (TOF) from Lanxess AG, Leverkusen.

E-3: Trilon BS ethylenediaminetetraacetic acid from BASF, Ludwigshafen.

F: potassium perfluorobutanesulphonate from Lanxess AG, Leverkusen.

Fibres: Pyrofil TRH50 60M carbon fibres from Mitsubishi Rayon Co., Ltd. having an individual filament diameter of 7 μm, a density of 1.81 g/cm³ and a tensile modulus of 250 GPa. 60000 individual filaments are supplied in a roving as an endless spool.

Preparation of the Compositions

The polycarbonate compositions described in the examples which follow were produced by compounding in an Evolum EV32HT extruder from Clextral (France) with a screw diameter of 32 mm. The screw set used was L7-8.2 at a throughput of 40-70 kg/h. The speed was 200-300 rpm at a melt temperature of 240-320° C. (according to the composition).

The pellets of the test formulations detailed were dried in a Labotek DDM180 dry air dryer at 80° C. for 4 hours.

Production of the Layers of the Fibre Composite Material/the Multilayer Composite Material:

Production of a Fibre Composite Material Layer

The fibre composite material layers were produced in an experimental setup as described in DE 10 2011 005 462 B3.

The rovings of the above-described fibres were rolled out with constant spool tension from a creel and spread out by means of a spreading apparatus to give a raw fibre tape of individual filaments of width 60 mm in a torsion-free manner.

The raw fibre tape was heated to a temperature above the glass transition temperature of the respective pellets.

The pellets of the respective experimental formulations were melted in an Ecoline 30×25d extruder from Maschinenbau Heilsbronn GmbH and conducted through melt channels to slot dies arranged above and below and transverse to the running direction of the fibre tape. The temperature in the melt zones of the extruder was about 280° C. to 300° C. After emerging from the slot dies, the respective melt encountered the heated raw fibre tape, with contact of the raw fibre tape with the melt on both sides. The raw fibre tape that had been contacted with melt, having been heated further by means of a permanently heated plate, was transported to vibration shoes that were again heated. By means of pressure-shear vibration by means of the vibration shoe as described in DE 10 2011 005 462 B3, the respective melts were introduced into the raw fibre tape. The result was fibre composite material layers of width 60 mm which, after passing through chill rolls, were rolled up.

Assembly of the Fibre Composite Material Layers—Part 1

The composite material layers of width 60 mm were welded at their edges by means of an experimental setup as described in DE 10 2011 090 143 A 1 to give broader tapes of width 480 mm, with all individual filaments still arranged in the same direction. The consolidated composite material layers were rolled up again.

Some of the assembled tapes from part 1 were subdivided into square sections orthogonally to the fibre orientation with a guillotine.

Assembly of the Fibre Composite Material Layers—Part 2

These square sections were consolidated at their original outer edges with a sealing bar to give a continuous composite material layer, and this process resulted in a fibre-reinforced composite material layer in which the orientation for all filaments was the same and was rotated by 90° in relation to the roll-off direction of the composite material layer. The composite material layer that had been consolidated in this way was rolled up.

Production of the Organosheets

All the organosheets examined hereinafter consisted of 4 fibre composite material layers, with 2 outer fibre composite material layers having the same fibre orientation and 2 inner fibre composite material layers having the same fibre orientation, the fibre orientation of the inner fibre composite material layers having been rotated by 90° in relation to the fibre orientation of the outer fibre composite material layers.

For this purpose, fibre composite material layers having corresponding orientation were rolled out and laid one on top of another in the sequence described above. Thereafter, the stack was supplied to a PLA 500 interval heating press from BTS Verfahrenstechnik GmbH and pressed at a temperature above the glass transition temperature of the impregnation formulations to give an organosheet.

The pressure applied across the surface here was 10 bar. The temperature in the heating zone was 280° C. and the temperature in the cooling zone was 100° C. In addition, the advance rate per cycle was 30 mm and the cycle time was 10 sec.

This resulted in samples having total thicknesses of 0.7 mm and 0.8 mm. The fibre composite material layers used for production of the organosheets accordingly had thicknesses of 175 μm and 200 μm. The fibre volume content of the fibre composite material layers was about 50% by volume per individual layer.

The organosheets thus produced were used to prepare samples with a Mutronic Diadisc 5200 tabletop circular saw. This involved preparing samples parallel to the fibre orientation in the outer layers, referred to hereinafter as 0° orientation, and transverse to the fibre orientation in the outer layers, referred to hereinafter as 90° orientation.

Methods:

Melt volume flow rate (MVR) was determined according to ISO 1133:2012-03 (predominantly at a test temperature of 300° C., mass 1.2 kg) using a Zwick 4106 instrument from Zwick Roell.

Melt viscosity was determined in accordance with ISO 11443:2005 with a Gottfert Visco-Robo 45.00 instrument.

Molecular weight Mw and Mn of the polycarbonate used was determined by means of gel permeation chromatography using a BPA polycarbonate calibration (method from Currenta GmbH & Co. OHG, Leverkusen: PSS SECcurity System; dichloromethane as eluent, column 1 (PL-PC5) with a concentration of 2 WI, flow rate 1.0 ml/min at a temperature of 30° C. using UV and/or RI detection). Polydispersity U is calculated as follows:

$$U = \frac{Mw}{Mn} - 1.$$

The thickness of the multilayer composite materials that result after joining was determined using a commercially available micrometer. The result reported is the arithmetic mean of 5 individual measurements at different positions.

The fire characteristics were measured according to UL94 V on bars of dimensions 127 mm×12.7 mm × organosheet thickness [mm]. For this purpose, multilayer composite materials composed of four layers of fibre composite material were analysed. The fibre material was unidirectionally oriented carbon fibres as described above.

"n.d." means "not determined" in each case.

Compositions and Results:

TABLE 1

| Formulation | | Comparative examples | | | |
|---|---|---|---|---|---|
| | | CE1 | CE2 | CE3 | CE4 |
| A-1 | % by wt. | 58.00 | 60.00 | 60.00 | 60.00 |
| A-2 | % by wt. | 20.00 | 20.00 | 19.80 | 19.40 |
| B | % by wt. | 10.00 | 10.00 | 10.00 | 10.00 |
| C | % by wt. | 5.00 | 5.00 | 5.00 | 5.00 |
| D | % by wt. | 7.00 | 5.00 | 5.00 | 5.00 |
| F | % by wt. | | | 0.20 | 0.60 |
| Tests | | | | | |
| $M_n$ | g/mol | n.d. | 8411 | 9339 | 9421 |
| $M_w$ | g/mol | n.d. | 22239 | 23784 | 23735 |
| U | | n.d. | 1.64 | 1.55 | 1.52 |
| MVR (300° C., 1.2 kg) | cm³/(10 min) | n.d. | 118.8* | 67.2 | 55.8 |
| Melt viscosity at 280° C. | | | | | |
| eta 50 | Pa · s | n.d. | 106 | 122 | 147 |
| eta 100 | Pa · s | | 105 | 120 | 145 |
| eta 200 | Pa · s | | 101 | 117 | 140 |
| eta 500 | Pa · s | | 95 | 109 | 134 |
| eta 1000 | Pa · s | | 85 | 98 | 117 |
| eta 1500 | Pa · s | | 78 | 89 | 105 |
| eta 5000 | Pa · s | | 52 | 60 | 65 |
| Melt viscosity at 300° C. | | | | | |
| eta 50 | Pa · s | n.d. | n.d. | n.d. | 75 |
| eta 100 | Pa · s | | | | 74 |
| eta 200 | Pa · s | | | | 73 |
| eta 500 | Pa · s | | | | 70 |
| eta 1000 | Pa · s | | | | 66 |
| eta 1500 | Pa · s | | | | 62 |
| eta 5000 | Pa · s | | | | — |
| Melt viscosity at 320° C. | | | | | |
| eta 50 | Pa · s | n.d. | n.d. | n.d. | 40 |
| eta 100 | Pa · s | | | | 40 |
| eta 200 | Pa · s | | | | 39 |
| eta 500 | Pa · s | | | | 38 |
| eta 1000 | Pa · s | | | | 38 |
| eta 1500 | Pa · s | | | | 36 |
| eta 5000 | Pa · s | | | | — |
| UL94V (organosheet, 0.8 mm, 0°) | | | | | |
| (48 h, 23° C.) | | V1 | V1 | V1 | n.d. |
| (7 d, 70° C.) | | n.d. | V1 | V1 | n.d. |
| Overall assessment | | n.d. | V1 | V1 | n.d. |
| UL94V (organosheet, 0.8 mm, 90°) | | | | | |
| (48 h, 23° C.) | | V1 | V1 | V1 | V1 |
| (7 d, 70° C.) | | n.d. | n.d. | V1 | V1 |
| Overall assessment | | n.d. | n.d. | V1 | V1 |

*test result inaccurate owing to the high MVR

TABLE 2

| Formulation | | Comparative examples CE5 | CE6 |
|---|---|---|---|
| A-1 | % by wt. | 63.00 | 58.00 |
| A-2 | % by wt. | 20.00 | 20.00 |
| B | % by wt. | 10.00 | 10.00 |
| C | % by wt. | | |
| D | % by wt. | 7.00 | 12.00 |
| Tests | | | |
| $M_n$ of pellets | g/mol | 9116 | 8381 |
| $M_w$ of pellets | g/mol | 25718 | 24945 |
| U of pellets | | 1.82 | 1.98 |
| MVR (300° C., 1.2 kg) | cm³/(10 min) | 44.5 | 72.8 |
| MVR (270° C., 1.2 kg) | cm³/(10 min) | 18.7 | 30.8 |
| Melt viscosity at 260° C. | | | |
| eta 50 | Pa · s | 941 | 282 |
| eta 100 | Pa · s | 849 | 257 |
| eta 200 | Pa · s | 726 | 240 |
| eta 500 | Pa · s | 532 | 212 |
| eta 1000 | Pa · s | 381 | 182 |
| eta 1500 | Pa · s | 293 | 158 |
| eta 5000 | Pa · s | 122 | 84 |
| Melt viscosity at 280° C. | | | |
| eta 50 | Pa · s | 262 | 174 |
| eta 100 | Pa · s | 251 | 170 |
| eta 200 | Pa · s | 238 | 158 |
| eta 500 | Pa · s | 204 | 140 |
| eta 1000 | Pa · s | 173 | 119 |
| eta 1500 | Pa · s | 153 | 107 |
| eta 5000 | Pa · s | 86 | 67 |
| Melt viscosity at 300° C. | | | |
| eta 50 | Pa · s | 199 | 78 |
| eta 100 | Pa · s | 197 | 77 |
| eta 200 | Pa · s | 188 | 75 |
| eta 500 | Pa · s | 170 | 72 |
| eta 1000 | Pa · s | 143 | 68 |
| eta 1500 | Pa · s | 124 | 65 |
| eta 5000 | Pa · s | 73 | 40 |
| UL94V on (organosheet, 0.7 mm, 90°) | | | |
| (48 h, 23° C.) | | V1 | V1 |
| (7 d, 70° C.) | | V0 | V0 |
| Overall assessment | | V1 | V1 |

TABLE 3

| Formulation | | IE1 | IE2 | IE3 | IE4 | IE5 | IE6 | IE7 | IE8 | IE9 | IE10 | IE11 | IE12 |
|---|---|---|---|---|---|---|---|---|---|---|---|---|---|
| A-1 | % by wt. | 52.90 | 58.00 | 51.00 | 58.00 | 50.00 | 60.00 | 57.00 | | | | | |
| A-2 | % by wt. | 20.00 | 20.00 | 20.00 | 20.00 | 20.00 | 20.00 | 20.00 | | | | | |
| A-3 | % by wt. | | | | | | | | 52.90 | 57.90 | 58.00 | 60.00 | |
| A-4 | % by wt. | | | | | | | | 20.00 | 20.00 | 20.00 | 20.00 | 20.00 |
| A-6 | % by wt. | | | | | | | | | | | | 59.90 |
| B | % by wt. | 10.00 | 5.00 | 12.00 | 10.00 | 10.00 | 10.00 | 10.00 | 10.00 | 5.00 | 5.00 | 3.00 | 5.00 |
| C | % by wt. | 10.00 | 10.00 | 10.00 | 10.00 | 10.00 | 10.00 | 13.00 | 10.00 | 10.00 | 10.00 | 10.00 | 8.00 |
| D | % by wt. | 7.00 | 7.00 | 7.00 | 2.00 | 10.00 | | | 7.00 | 7.00 | 7.00 | 7.00 | 7.00 |
| E-1 | % by wt. | 0.10 | | | | | | | 0.10 | 0.10 | | | 0.10 |
| Tests | | | | | | | | | | | | | |
| $M_n$ of pellets | g/mol | 11242 | 10557 | 8697 | 9287 | 8373 | 10336 | 9908 | n.d. | n.d. | n.d. | n.d. | 9393 |
| $M_w$ of pellets | g/mol | 31348 | 30766 | 27314 | 26811 | 26917 | 28430 | 28137 | n.d. | n.d. | n.d. | n.d. | 23686 |
| U of pellets | | 1.79 | 1.91 | 2.14 | 1.89 | 2.21 | 1.75 | 1.84 | n.d. | n.d. | n.d. | n.d. | 1.52 |
| U of fibre composite material layer | | 1.77 | 1.95 | n.d. | n.d. | n.d. | n.d. | n.d. | n.d. | n.d. | n.d. | n.d. | n.d. |
| MVR (300° C., 1.2 kg) | cm³/(10 min) | 27.6 | 59.7 | n.d. | 99.4 | n.d. | 82.4 | 114.0 | 71.5 | 74.2 | 100 | 75.8 | 40.2 |
| MVR (270° C., 1.2 kg) | cm³/(10 min) | 10.9 | 19.8 | 46.6 | 28.6 | 64.7 | 17.4 | 26.9 | 28.0 | 31.4 | 40.1 | 33.4 | 16.9 |
| Melt viscosity at 260° C. | | | | | | | | | | | | | |
| eta 50 | Pa · s | 520 | 427 | 189 | 245 | 156 | 244 | 165 | 218 | 207 | 171 | 185 | 660 |
| eta 100 | Pa · s | 490 | 407 | 186 | 243 | 154 | 238 | 163 | 214 | 205 | 165 | 183 | 632 |
| eta 200 | Pa · s | 445 | 372 | 181 | 239 | 151 | 228 | 159 | 206 | 198 | 160 | 181 | 523 |
| eta 500 | Pa · s | 353 | 302 | 157 | 205 | 131 | 208 | 152 | 178 | 177 | 146 | 165 | 392 |
| eta 1000 | Pa · s | 271 | 235 | 131 | 170 | 110 | 174 | 138 | 150 | 151 | 125 | 143 | 296 |
| eta 1500 | Pa · s | 221 | 194 | 114 | 148 | 97 | 154 | 120 | 132 | 132 | 111 | 126 | 243 |
| eta 5000 | Pa · s | 102 | 92 | 69 | 80 | 55 | 88 | 72 | 73 | 78 | | 61 | 113 |
| Melt viscosity at 280° C. | | | | | | | | | | | | | |
| eta 50 | Pa · s | 260 | 203 | 81 | 104 | 69 | n.d. | 75 | 113 | 112 | 105 | 101 | 491 |
| eta 100 | Pa · s | 253 | 198 | 80 | 102 | 68 | | 74 | 111 | 111 | 100 | 99 | 391 |
| eta 200 | Pa · s | 243 | 192 | 78 | 100 | 66 | | 72 | 107 | 108 | 95 | 97 | 309 |
| eta 500 | Pa · s | 207 | 169 | 74 | 96 | 64 | | 69 | 99 | 102 | 81 | 95 | 241 |
| eta 1000 | Pa · s | 169 | 143 | 67 | 86 | 57 | | 63 | 88 | 92 | 74 | 87 | 197 |
| eta 1500 | Pa · s | 148 | 125 | 61 | 78 | 53 | | 55 | 80 | 85 | | 80 | 170 |
| eta 5000 | Pa · s | 81 | 70 | 41 | 51 | 37 | | 33 | 52 | 55 | | | 91 |
| Melt viscosity at 300° C. | | | | | | | | | | | | | |
| eta 50 | Pa · s | 152 | 128 | 38 | 44 | 44 | n.d. | n.d. | 63 | 62 | 47 | 36 | 337 |
| eta 100 | Pa · s | 149 | 126 | 37 | 43 | 43 | | | 62 | 61 | 47 | 49 | 260 |

TABLE 3-continued

Examples according to the invention

| Formulation | | IE1 | IE2 | IE3 | IE4 | IE5 | IE6 | IE7 | IE8 | IE9 | IE10 | IE11 | IE12 |
|---|---|---|---|---|---|---|---|---|---|---|---|---|---|
| eta 200 | Pa · s | 143 | 122 | 36 | 42 | 42 | | | 60 | 59 | 46 | 56 | 209 |
| eta 500 | Pa · s | 129 | 113 | 35 | 41 | 40 | | | 58 | 56 | 49 | 67 | 174 |
| eta 1000 | Pa · s | 112 | 98 | 34 | 40 | 38 | | | 52 | 49 | 47 | 56 | 146 |
| eta 1500 | Pa · s | 100 | 88 | 33 | 39 | 35 | | | 46 | 43 | | 53 | 128 |
| eta 5000 | Pa · s | 60 | 55 | 25 | 28 | 26 | | | 30 | 26 | | | 74 |
| UL94V (organosheet, 0.7 mm, 0°) | | | | | | | | | | | | | |
| (48 h, 23° C.) | | V0 | V0 | V0 | V0 | V0 | V0 | V0 | V0 | V0 | V0 | V0 | V0 |
| (7 d, 70° C.) | | V0 | V0 | V0 | V0 | V0 | V0 | V0 | V0 | V0 | V0 | V0 | V0 |
| Overall assessment | | V0 | V0 | V0 | V0 | V0 | V0 | V0 | V0 | V0 | V0 | V0 | V0 |
| UL94V on (organosheet, 0.7 mm, 90°) | | | | | | | | | | | | | |
| (48 h, 23° C.) | | V0 | V0 | V0 | V0 | V0 | V0 | V0 | V0 | V0 | V0 | V0 | V0 |
| (7 d, 70° C.) | | V0 | V0 | V0 | V0 | V0 | V0 | V0 | V0 | V0 | V0 | V0 | V0 |
| Overall assessment | | V0 | V0 | V0 | V0 | V0 | V0 | V0 | V0 | V0 | V0 | V0 | V0 |

TABLE 4

Inventive examples

| Formulation | | IE13 | IE14 |
|---|---|---|---|
| A-1 | % by wt. | | 57.90 |
| A-2 | % by wt. | 20.00 | 20.00 |
| A-5 | % by wt. | 57.90 | |
| B | % by wt. | 5.00 | 5.00 |
| C | % by wt. | 10.00 | 10.00 |
| D | % by wt. | 7.00 | 7.00 |
| E-1 | % by wt. | 0.10 | 0.10 |
| Tests | | | |
| MVR (300° C., 1.2 kg) | cm³/(10 min) | 33.8 | 26.6 |
| MVR (270° C., 1.2 kg) | cm³/(10 min) | 14.6 | 11.4 |
| Melt viscosity at 260° C. | | | |
| eta 50 | Pa · s | 624 | 363 |
| eta 100 | Pa · s | 511 | 324 |
| eta 200 | Pa · s | 383 | 284 |
| eta 500 | Pa · s | 251 | 240 |
| eta 1000 | Pa · s | 188 | 195 |
| eta 1500 | Pa · s | 150 | 168 |
| eta 5000 | Pa · s | 80 | 99 |
| Melt viscosity at 280° C. | | | |
| eta 50 | Pa · s | 448 | 257 |
| eta 100 | Pa · s | 351 | 224 |
| eta 200 | Pa · s | 275 | 195 |
| eta 500 | Pa · s | 192 | 168 |
| eta 1000 | Pa · s | 152 | 141 |
| eta 1500 | Pa · s | 121 | 120 |
| eta 5000 | Pa · s | 59 | 71 |
| Melt viscosity at 300° C. | | | |
| eta 50 | Pa · s | 335 | 182 |
| eta 100 | Pa · s | 281 | 158 |
| eta 200 | Pa · s | 220 | 148 |
| eta 500 | Pa · s | 161 | 126 |
| eta 1000 | Pa · s | 121 | 107 |
| eta 1500 | Pa · s | 101 | 95 |
| UL94V on (organosheet, 0.7 mm, 0°) | | | |
| (48 h, 23° C.) | | V0 | V0 |
| (7 d, 70° C.) | | V0 | V0 |
| Overall assessment | | V0 | V0 |
| UL94V on (organosheet, 0.7 mm, 90°) | | | |
| (48 h, 23° C.) | | V0 | V0 |
| (7 d, 70° C.) | | V0 | V0 |
| Overall assessment | | V0 | V0 |

TABLE 5

Inventive examples-stabilization

| Formulation | | IE15 | IE16 | IE17 | IE18 |
|---|---|---|---|---|---|
| A-1 | % by wt. | 53.00 | 53.00 | 53.00 | 53.00 |
| A-2 | % by wt. | 20.00 | 19.90 | 19.98 | 19.98 |
| A-5 | % by wt. | | | | |
| B | % by wt. | 10.00 | 10.00 | 10.00 | 10.00 |
| C | % by wt. | 10.00 | 10.00 | 10.00 | 10.00 |
| D | % by wt. | 7.00 | 7.00 | 7.00 | 7.00 |
| E-1 | % by wt. | | 0.10 | | |
| E-2 | % by wt. | | | 0.02 | |
| E-3 | % by wt. | | | | 0.02 |
| Tests | | | | | |
| MVR (240° C., 1.2 kg) | | 11.4 | 3.7 | 7.4 | 7.3 |
| MVR (240° C., 2.16 kg) | cm³/(10 min) | 20.8 | 7.0 | 14.2 | 13.7 |
| MVR (250° C., 1.2 kg) | cm³/(10 min) | 17.7 | 5.4 | 11.4 | 11.5 |

TABLE 5-continued

| Inventive examples-stabilization | | | | | |
|---|---|---|---|---|---|
| Formulation | | IE15 | IE16 | IE17 | IE18 |
| MVR (250° C., 2.16 kg) | cm³/(10 min) | 32.5 | 10.5 | 21.3 | 21.3 |
| MVR (260° C., 1.2 kg) | cm³/(10 min) | 25.7 | 7.4 | 15.8 | 16.3 |

The results show that it is possible only with the compositions used in accordance with the invention to attain a V0 classification coupled with good processability; the compositions according to the comparative examples did not give organosheets that attained a V0 classification.

The invention claimed is:

1. A process for producing a layer of fibre composite material, wherein a molten, aromatic polycarbonate-based composition comprising
A) aromatic polycarbonate,
B) 1% by weight to 14% by weight of talc,
C) 7% by weight to 15% by weight of at least one cyclic phosphazene of formula (1)

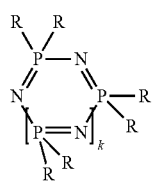
(1)

where
R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical,
k is an integer from 1 to 10,
D) 0% to 11% by weight of at least one phosphorus compound of general formula (V)

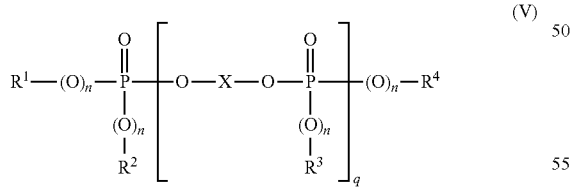
(V)

where
$R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen,
n is independently 0 or 1,
q is an integer from 0 to 30,
X is a mono- or polycyclic aromatic radical having 6 to 30 carbon atoms or a linear or branched aliphatic radical having 2 to 30 carbon atoms, each of which may be substituted or unsubstituted, and bridged or unbridged;
E) 0% to 0.2% by weight of at least one stabilizer selected from a group consisting of alkyl phosphate, ethylenediaminetetraacetic acid and citric acid,
wherein the composition is free of PTFE,
is applied to a raw fibre tape composed of fibre material that has been preheated to above the glass transition temperature of the polycarbonate.

2. A process for producing a multilayer composite material, comprising the following steps:
providing at least one inner layer of fibre composite material and two outer layers of fibre composite material, wherein the individual layers of fibre composite material are produced by applying a molten, aromatic polycarbonate-based composition comprising
A) aromatic polycarbonate,
B) 1% by weight to 14% by weight of talc,
C) 7% by weight to 15% by weight of at least one cyclic phosphazene of formula (1)

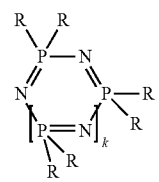
(1)

where
R is the same or different and is an amine radical, an in each case optionally halogenated $C_1$- to $C_8$-alkyl radical, $C_1$- to $C_8$-alkoxy radical, in each case optionally alkyl- and/or halogen-substituted $C_5$- to $C_6$-cycloalkyl radical, in each case optionally alkyl- and/or halogen- and/or hydroxyl-substituted $C_6$- to $C_{20}$-aryloxy radical, in each case optionally alkyl- and/or halogen-substituted $C_7$- to $C_{12}$-aralkyl radical or a halogen radical or an OH radical,
k is an integer from 1 to 10,
D) 0% to 11% by weight of at least one phosphorus compound of general formula (V)

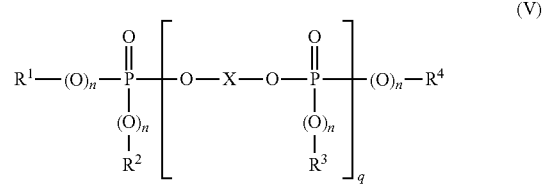
(V)

where
- $R^1$, $R^2$, $R^3$ and $R^4$ are each independently a $C_1$- to $C_8$-alkyl radical, in each case optionally halogenated and in each case branched or unbranched, and/or $C_5$- to $C_6$-cycloalkyl radical, $C_6$- to $C_{20}$-aryl radical or $C_7$- to $C_{12}$-aralkyl radical, in each case optionally substituted by branched or unbranched alkyl and/or halogen,
- n is independently 0 or 1,
- q is an integer from 0 to 30,
- X is a mono- or polycyclic aromatic radical having 6 to 30 carbon atoms or a linear or branched aliphatic radical having 2 to 30 carbon atoms, each of which may be substituted or unsubstituted, and bridged or unbridged;

E) 0% to 0.2% by weight of at least one stabilizer selected from a group consisting of alkyl phosphate, ethylenediaminetetraacetic acid and/or citric acid, wherein the composition is free of PTFE, to a raw fibre tape composed of fibre material that has been preheated to above the glass transition temperature of the polycarbonate, layering the layers of fibre composite material in the desired orientation relative to one another, based on the orientation of the fibre material, bonding the layered layers of fibre composite material to form the multilayer composite material.

3. The process according to claim 1, wherein the composition is applied to the raw fibre tape under pressure-shear vibration.

4. The process according to claim 1, wherein the fibre material is selected from a group consisting of carbon fibres, glass fibres, basalt fibres and mixtures thereof and comprises endless fibres, a weave or a knit.

5. The process according to claim 1, wherein the fibre material are endless fibres and the endless fibres are aligned unidirectionally.

6. The process according to claim 1, wherein the composition comprises 3% to 12% by weight of talc, 10% to 13% by weight of phosphazene as per component C and 2% to 10% by weight of at least one phosphorus compound of the general formula (V) as per component D.

7. The process according to claim 2, wherein the inner layers of fibre composite material have essentially the same orientation and the orientation thereof relative to the outer layers of fibre composite material is rotated by 30° to 90°, wherein the orientation of one layer of fibre composite material is determined by the orientation of the unidirectionally aligned fibres present therein.

8. The multilayer composite material according to claim 2, wherein at least some of the layers have the same orientation and at least some other layers are rotated by 30° to 90° and the outer layers are at a 0° orientation with respect thereto.

9. The multilayer composite material according to claim 2, wherein the inner layers have the same orientation and the orientations thereof relative to the outer layers of fibre composite material are rotated by 30° to 90°.

10. The multilayer composite material according to claim 2, wherein the fibre volume content of the outer layers of fibre composite material is not more than 50% by volume, based on the volume of the outer layers of fibre composite material.

11. The process according to claim 1, wherein the molten, aromatic polycarbonate-based composition further comprises further additives.

\* \* \* \* \*